United States Patent
Hong et al.

(10) Patent No.: US 12,435,922 B2
(45) Date of Patent: Oct. 7, 2025

(54) REFRIGERATOR, METHOD FOR CONTROLLING THE REFRIGERATOR, HOME APPLIANCE, CONTROL SYSTEM OF THE HOME APPLIANCE

(71) Applicant: LG Electronics Inc., Seoul (KR)

(72) Inventors: Yoonjung Hong, Seoul (KR); Kunwoo Lee, Seoul (KR); Heekyung Kang, Seoul (KR); Yongbeom Ma, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 18/586,094

(22) Filed: Feb. 23, 2024

(65) Prior Publication Data

US 2024/0191939 A1    Jun. 13, 2024

Related U.S. Application Data

(63) Continuation of application No. 18/086,128, filed on Dec. 21, 2022, now Pat. No. 11,940,208.

(30) Foreign Application Priority Data

Dec. 21, 2021  (KR) ........................ 10-2021-0184114

(51) Int. Cl.
| | | |
|---|---|---|
| F25D 27/00 | (2006.01) | |
| F25D 23/02 | (2006.01) | |
| H05B 47/105 | (2020.01) | |

(52) U.S. Cl.
CPC ......... *F25D 27/005* (2013.01); *F25D 23/028* (2013.01); *H05B 47/105* (2020.01); *F25D 2327/001* (2013.01)

(58) Field of Classification Search
CPC ................. F25D 27/005; F25D 23/028; F25D 2327/001; H05B 47/105
See application file for complete search history.

(56) References Cited

U.S. PATENT DOCUMENTS

| | | |
|---|---|---|
| 8,789,900 B2 | 7/2014 | Laible et al. |
| 2008/0163641 A1 | 7/2008 | Mitchell |

(Continued)

FOREIGN PATENT DOCUMENTS

| | | |
|---|---|---|
| CN | 103250018 | 8/2013 |
| CN | 204555478 | 8/2015 |

(Continued)

OTHER PUBLICATIONS

Office Action in Korean Appln. No. 10-2024-0023768, mailed on May 28, 2024, 8 pages (with English translation).

(Continued)

*Primary Examiner* — Gerald J Sufleta, II
(74) *Attorney, Agent, or Firm* — Fish & Richardson P.C.

(57) ABSTRACT

A refrigerator includes a cabinet including a space, a door configured to open and close the space and including a light source and a front plate, through which light emitted from the light source passes, an output interface provided on the cabinet or the door to output sound, a communication unit configured to communicate with a remote device and a controller configured to play music through the output interface and to control the light source in association with music playback through the output interface, when a music playback command is received from the remote device through the communication interface.

19 Claims, 15 Drawing Sheets

(56) References Cited

U.S. PATENT DOCUMENTS

| | | | |
|---|---|---|---|
| 2014/0144083 A1 | 5/2014 | Artwohl et al. | |
| 2015/0035432 A1* | 2/2015 | Kendall | F25D 27/005 |
| | | | 315/76 |
| 2017/0191746 A1* | 7/2017 | Seo | F25D 27/005 |
| 2018/0274848 A1* | 9/2018 | Kim | F25D 23/028 |
| 2019/0216243 A1* | 7/2019 | Honig | F21V 23/0485 |
| 2020/0088457 A1 | 3/2020 | Kang et al. | |
| 2020/0271373 A1* | 8/2020 | Choe | F25D 23/061 |
| 2021/0106134 A1 | 4/2021 | Deng | |

FOREIGN PATENT DOCUMENTS

| | | |
|---|---|---|
| EP | 4067786 | 10/2022 |
| JP | 2019-032159 | 2/2019 |
| KR | 10-2005-0095359 | 9/2005 |
| KR | 10-2012-0134443 | 12/2012 |
| KR | 10-2018-0013185 | 2/2018 |
| KR | 10-2018-0049663 | 5/2018 |
| KR | 10-2018-0080029 | 7/2018 |
| KR | 10-2019-0024415 | 3/2019 |
| KR | 10-2019-0097638 | 8/2019 |
| KR | 10-2338632 | 12/2021 |
| WO | WO 2021107345 | 6/2021 |

OTHER PUBLICATIONS

Extended European Search Report in European Appln. No. 22214534.4, mailed on Apr. 13, 2023, 5 pages.

Extended European Search Report in European Appln. No. 22214534.4, mailed on Jun. 19, 2023, 5 pages.

Notice of Allowance in Korean Appln. No. 10-2021-0184114, mailed on Nov. 21, 2023, 16 pages (with English translation).

Office Action in Korean Appln. No. 10-2021-0184114, mailed on May 15, 2023, 591 pages (with English translation).

* cited by examiner

FIG. 4
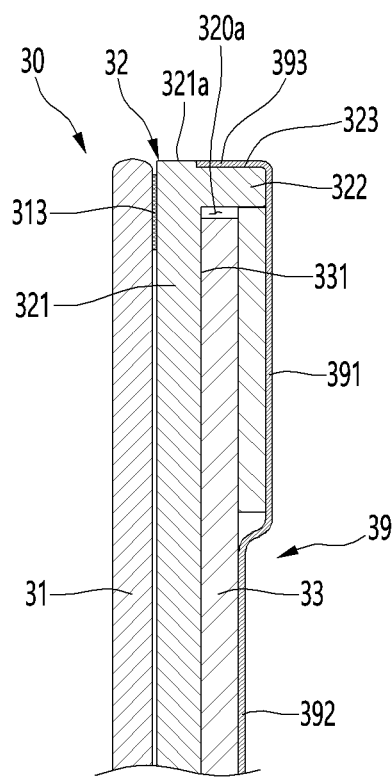
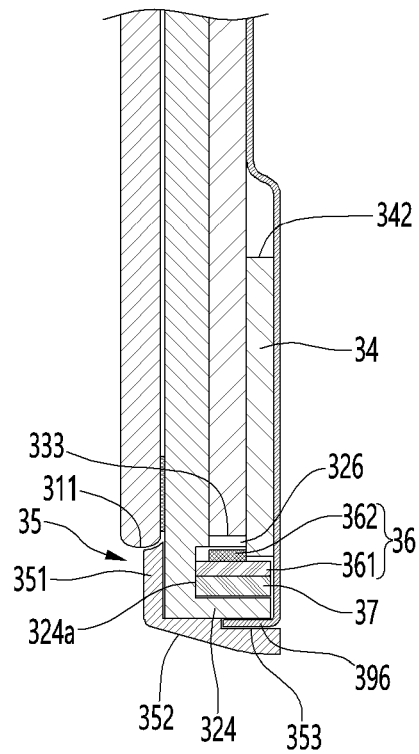

FIG. 6
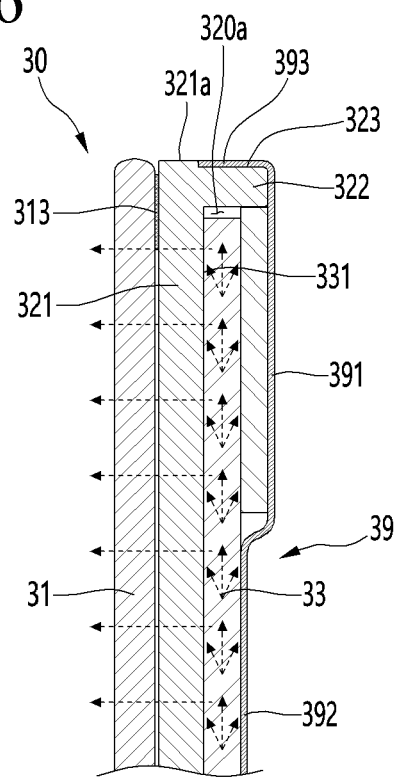
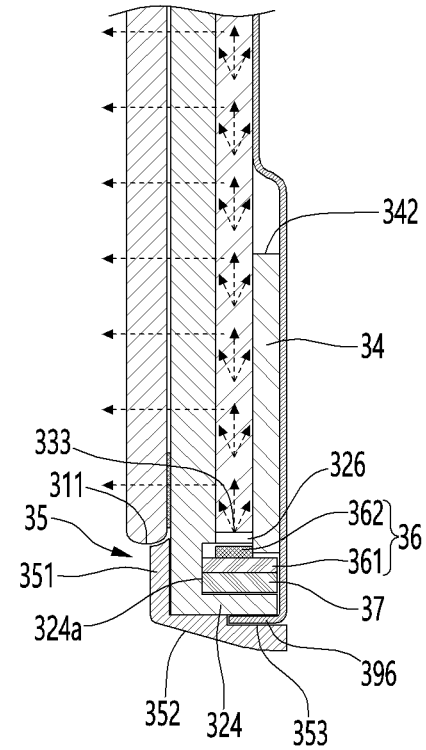

REFRIGERATOR, METHOD FOR CONTROLLING THE REFRIGERATOR, HOME APPLIANCE, CONTROL SYSTEM OF THE HOME APPLIANCE

CROSS-REFERENCE TO RELATED APPLICATIONS

The present application is a continuation of U.S. application Ser. No. 18/086,128, filed on Dec. 21, 2022, which claims priority under 35 U.S.C. 119 and 35 U.S.C. 365 to Korean Patent Application No. 10-2021-0184114, filed on Dec. 21, 2021, which are hereby incorporated by reference in their entirety.

FIELD

The present disclosure relates to a refrigerator, a method of controlling a refrigerator, a home appliance and a home appliance control system.

BACKGROUND

In general, a refrigerator is a home appliance for storing foods in an internal storage space, which is shield by a refrigerator door, at a low temperature by low temperature air. The refrigerator cools the inside of the storage space using cool air generated by heat-exchanging with a refrigerant that circulates a cooling cycle to store the foods in an optimum state.

Such refrigerators tend to increase more and more in size and provide multi-functions due to the trends of change of dietary life and high quality, and accordingly, refrigerators provided with various structures and convenience devices in consideration of user convenience are brought to the market.

In order to harmonize with an environment in which the refrigerator is disposed or with surrounding furniture or home appliances, technologies structures for varying an outer appearance of a door front of the refrigerator are developed, and this trend is the same throughout the home appliance.

U.S. Pat. No. 8,789,900 (Cited Reference 1) discloses a structure in which a decoration panel forming an outer appearance is installed on a door front of a refrigerator, and here, the outer appearance of the door front is formed according to a user's preference by detachably configuring the decoration panel.

However, the refrigerator of the Cited Reference 1 has a problem in that, when a user wants to change the outer appearance, the entire decoration panel needs to be removed and replaced, and it is not possible to use the decoration panel before replacement any longer.

To solve this limitation, Chinese Patent Application No. 103250018 (Cited Reference 2) discloses a refrigerator in which a reflective layer and a transparent panel are disposed on a door front and colored light emitting members are mounted on both side ends of the reflective layer to cause the transparent panel to glow with set color.

However, Cited Reference 2 does not disclose technology for operating a light emitting member or controlling operation of the light emitting member in a process of reproducing music in a refrigerator.

SUMMARY

The present embodiment provides a refrigerator capable of controlling a light source for enabling a door to glow while reproducing music, a method of controlling a refrigerator, a home appliance and a home appliance control system.

Selectively or additionally, the present embodiment provides a refrigerator capable of changing a method of controlling a light source according to played music, a method of controlling a refrigerator, a home appliance and a home appliance control system.

Selectively or additionally, the present embodiment provides a refrigerator capable of detecting sound of played music to control a light source, a method of controlling a refrigerator, a home appliance and a home appliance control system.

A refrigerator according to an embodiment of the present disclosure may comprise a cabinet including a space and a door configured to open and close the space and including a light source and a front plate, through which light emitted from the light source passes.

The refrigerator may further comprise an output interface provided on the cabinet or the door to output sound.

The refrigerator may further comprise a communication unit configured to communicate with a remote device.

The refrigerator may further comprise a controller configured to play music through the output interface and to control the light source in association with music playback through the output interface, when a music playback command is received from the remote device through the communication interface.

The door may include a door body including a heat insulating material, and the front plate may be detachably mounted on the door body and may form an outer appearance of a front surface of the door.

The front plate may be formed of a glass material or is formed of any one of ABS, PMMA or PC.

The refrigerator may further comprise a memory configured to store a control pattern for controlling the light source.

When the music playback command is received from the remote device, the controller may select a control pattern from the memory and control the light source based on the selected control pattern.

The refrigerator may further comprise a memory configured to store a plurality of control patterns for controlling the light source in response to music information.

When a music playback command and music information are received from the remote device, the controller may select a control pattern corresponding to the received music information from the memory and control the light source based on the selected control pattern.

The received music information may include one or more of a music genre and a beats per minute (BPM).

When the control pattern includes repetitive on and off of the light source, a blinking time of the light source when the BPM is large may be shorter than that of the light source when the BPM is small.

When the control pattern includes a color change of the light source, a color change period of the light source when the BPM is large may be shorter than that of the light source when the BPM is small, or the number of color changes of the light source when the BPM is large may be greater than that of the light source when the BPM is small.

When a music playback command and control information of the light source based on played music are received from the remote device, the controller may play music through the output interface and control the light source based on the received control information.

The refrigerator may further comprise a sound sensor configured to detect sound output from the output interface.

When the music playback command is received from the remote device through the communication unit, the controller may play music through the output interface and control the light source based on sound information of the output interface detected by the sound sensor.

The controller may controls the light source when a specific event occurs, and a color when the light source operates is changeable according to the specific event.

The refrigerator may further comprise a memory configured to store a color when the light source operates to match the specific event.

When color information matching when the specific event occurs is received from the remote device, the color information matching the specific event stored in the memory may be changed to the received color information.

When a first color is selected in the remote device, R, G and B value information of the light source of a second color different from a first color may be received from the remote device and stored in the memory.

The first color may be a color included in a region selected from an image displayed on a screen of the remote device or a color selected by a color selector displayed on the screen of the remote device.

A refrigerator according to another aspect may comprise a cabinet including a space, a door configured to open and close the space and including a light source and a front plate, through which light emitted from the light source passes, and an output interface provided on the cabinet or the door to output sound.

The refrigerator may further comprise a manipulator configured to input a command for playing music through the output interface.

The refrigerator may further comprise a controller configured to play music through the output interface and to control the light source in association with music playback through the output interface, when the command for playing the music is input by the manipulator.

The door may include a door body including a heat insulating material, and the front plate may be detachably mounted on the door body and may form an outer appearance of a front surface of the door.

The manipulator may be provided in the cabinet or the door.

The refrigerator may further comprise a memory configured to store a control pattern for controlling the light source.

When the command for playing the music is input, the controller may play the music through the output interface and control the light source based on a control pattern stored in the memory.

The refrigerator may further comprise a sound sensor configured to detect sound output from the output interface.

The controller may play music through the output interface and control the light source based on sound information of the output interface detected by the sound sensor.

A method of controlling a refrigerator according to another aspect comprises a cabinet including a space, a door including a door body configured to open and close the space and including a heat insulating material and a front plate detachably mounted on the door body and forming an outer appearance of a front surface, a light source configured to emit light, the emitted light passing through the front plate, an output interface configured to output sound, a communication unit configured to communicate with a remote device, and a controller configured to control the output interface and the light source.

The method of controlling the refrigerator may comprise the refrigerator receiving a music playback command from the remote device and the controller of the refrigerator playing music through the output interface and controlling the light source in a process of playing music through the output interface.

The refrigerator may include a memory configured to store a control pattern for controlling the light source.

When a music playback command is received from the remote device, the controller may select a control pattern from the memory and control the light source based on the selected control pattern.

The refrigerator may include a memory configured to store a plurality of control patterns for controlling the light source in response to music information.

The controlling the light source may further comprise, when a music playback command and music information are received from the remote device, the controller selecting a control pattern corresponding to the received music information from the memory.

The controlling the light source may further comprise controlling the light source based on the selected control pattern.

The receiving the music playback command may comprise receiving, from the remote device, control information of the light source based on played music along with the music playback command.

The controlling the light source may comprise the controller playing music through the output interface. The controlling the light source may comprise controlling the light source based on the received control information.

BRIEF DESCRIPTION OF THE DRAWINGS

FIG. 4 is a cross-sectional view taken along line 4-4 of FIG. 3.

FIG. 6 is a vertical cross-sectional view showing a light emitting state of the panel assembly.

DETAILED DESCRIPTION OF THE PREFERRED EMBODIMENTS

Hereinafter, detailed embodiments will be described in detail with reference to the accompanying drawings. However, the present disclosure is limited to the embodiments in which the spirit of the present disclosure is proposed, and other degenerate idea or other embodiments included in the scope of the present disclosure may be easily proposed by addition, changes, deletions, etc. of other elements.

Hereinafter, a refrigerator will be described as an example of a home appliance, but the description of the refrigerator according to the present disclosure may be applied to various home appliances including a cabinet having a space therein and a door configured to open and close the space. The home appliance may include, for example, an air conditioner, a clothes manager, a washing machine, a dryer, a dish washing machine, a cooking appliance, and the like.

Furthermore, a home appliance according to the present disclosure is not limited to a home appliance in which an inner space of a cabinet is opened and closed, and it is to be noted that the home appliance according to the present disclosure is also applicable to a home appliance in which an inner space of a cabinet is not opened and closed.

Prior to a description, directions are defined. In an embodiment of the present disclosure, a direction toward a door is defined as a front direction with respect to a cabinet shown in FIGS. 1 and 2, a direction toward the cabinet with respect to the door is defined as a rear direction, a direction toward a bottom on which a refrigerator is installed is defined as a downward direction, and a direction away from the bottom is defined as an upward direction.

Figure 1:
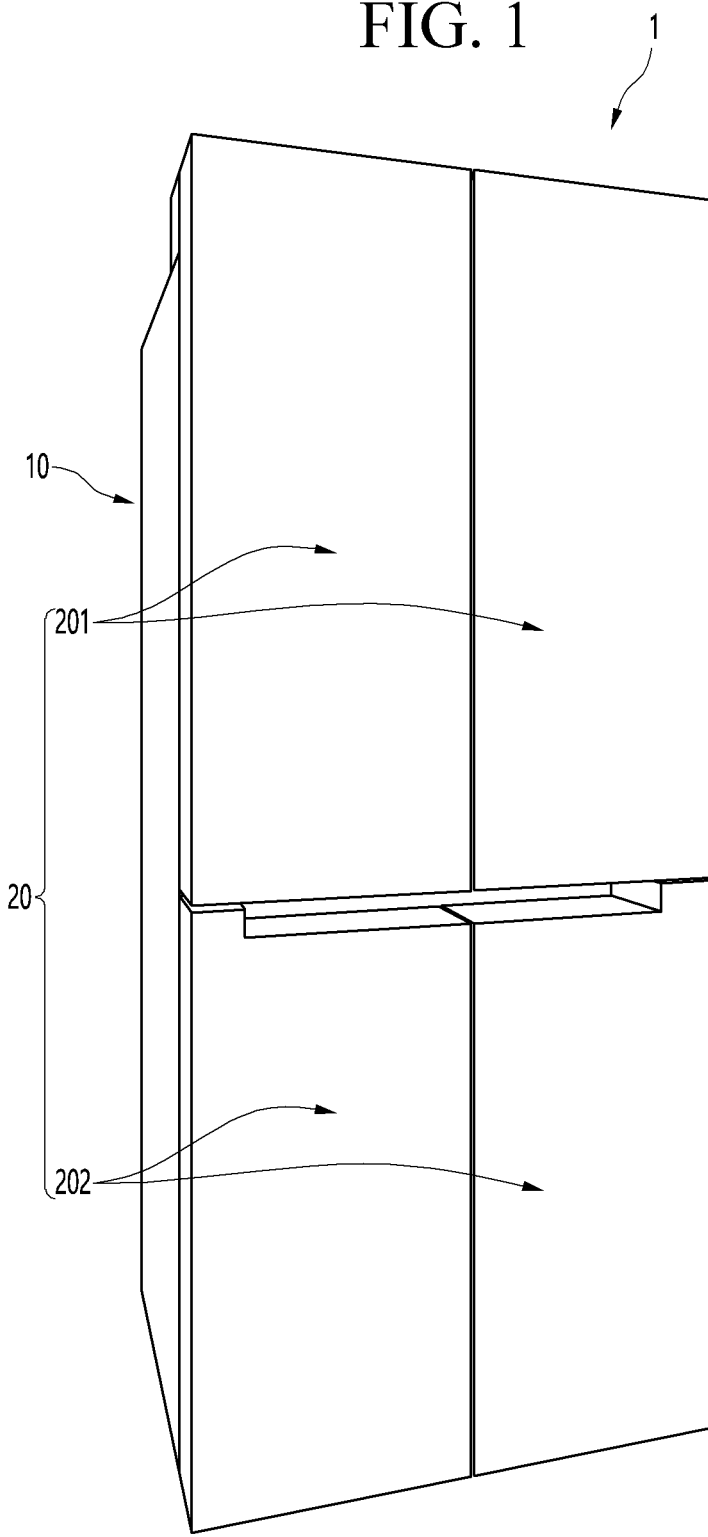
FIG. 1 is a front view of a refrigerator according to an embodiment of the present disclosure.

FIG. 1 is a perspective view of a refrigerator according to an embodiment.

Referring to FIGS. 1, a refrigerator 1 according to an embodiment of the present disclosure may include a cabinet 10 defining a storage space (or storage section) and a door 20 for opening and closing the storage space of the cabinet 10.

For example, the cabinet 10 may form the storage space partitioned in a vertical direction, a refrigerating compartment may be formed at an upper portion, and a freezing compartment may be formed at a lower portion. The refrigerating compartment may be referred to as an upper storage space, and the freezing compartment may be referred to as a lower storage space.

The door 20 may open and close each of the refrigerating compartment and the freezing compartment. For example, the door 20 may be rotatably mounted on the cabinet 10, and the refrigerating compartment and the freezing compartment may each be opened and closed by rotation. Alternatively, the door 20 may be configured to open and close the refrigerating compartment and/or the freezing compartment by being drawn in and out.

The door 20 may include a refrigerating compartment door 201 for opening and closing the refrigerating compartment and a freezing compartment door 202 for opening and closing the freezing compartment. The refrigerating compartment door 201 may be referred to as an upper door, and the freezing compartment door 202 may be referred to as a lower door.

The refrigerating compartment door 201 may include a pair of a left refrigerating compartment door and a right refrigerating compartment door that are arranged side by side. The left refrigerating compartment door and the right refrigerating compartment door may open and close the refrigerating compartment while being independently rotated. The left refrigerating compartment door and the right refrigerating compartment door may be disposed adjacent to each other and may have the same size.

The freezing compartment door 202 may include a pair of a left freezing compartment door and a right freezing compartment door that are arranged side by side. The left freezing compartment door and the right freezing compartment door may open and close the freezing compartment while being independently rotated. The left freezing compartment door and the right freezing compartment door may be disposed adjacent to each other and may have the same size.

Needless to say, although a refrigerator having a structure in which the refrigerating compartment is defined above the freezing compartment is described as an example in this embodiment, the present disclosure may be applied to all types of refrigerators equipped with a door without being limited to a type of a refrigerator.

An outer appearance of the front surface of the refrigerator 1 may be formed in the state in which the door 20 is closed and may form the out appearance of the refrigerator 1 viewed from the front in the state in which the refrigerator 1 is installed.

The door 20 may have a structure in which a front surface selectively emits light and may be configured to glow with set color or brightness. Thus, a user may change front color or brightness of the door 20 without separating or disassembling the door 20 and may change the overall outer appearance of the refrigerator 1.

Hereinafter, the structure of the door 20 will be described in detail with reference to drawings.

Figure 2:
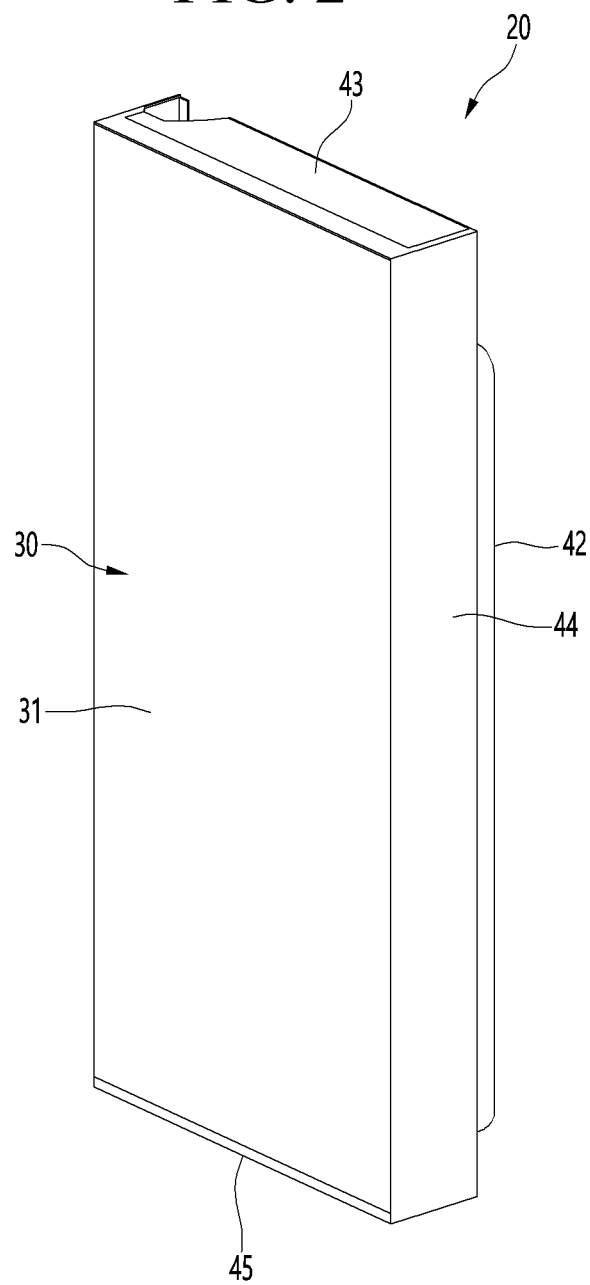
FIG. 2 is a perspective view of a refrigerator door according to an embodiment present disclosure.
Figure 3:
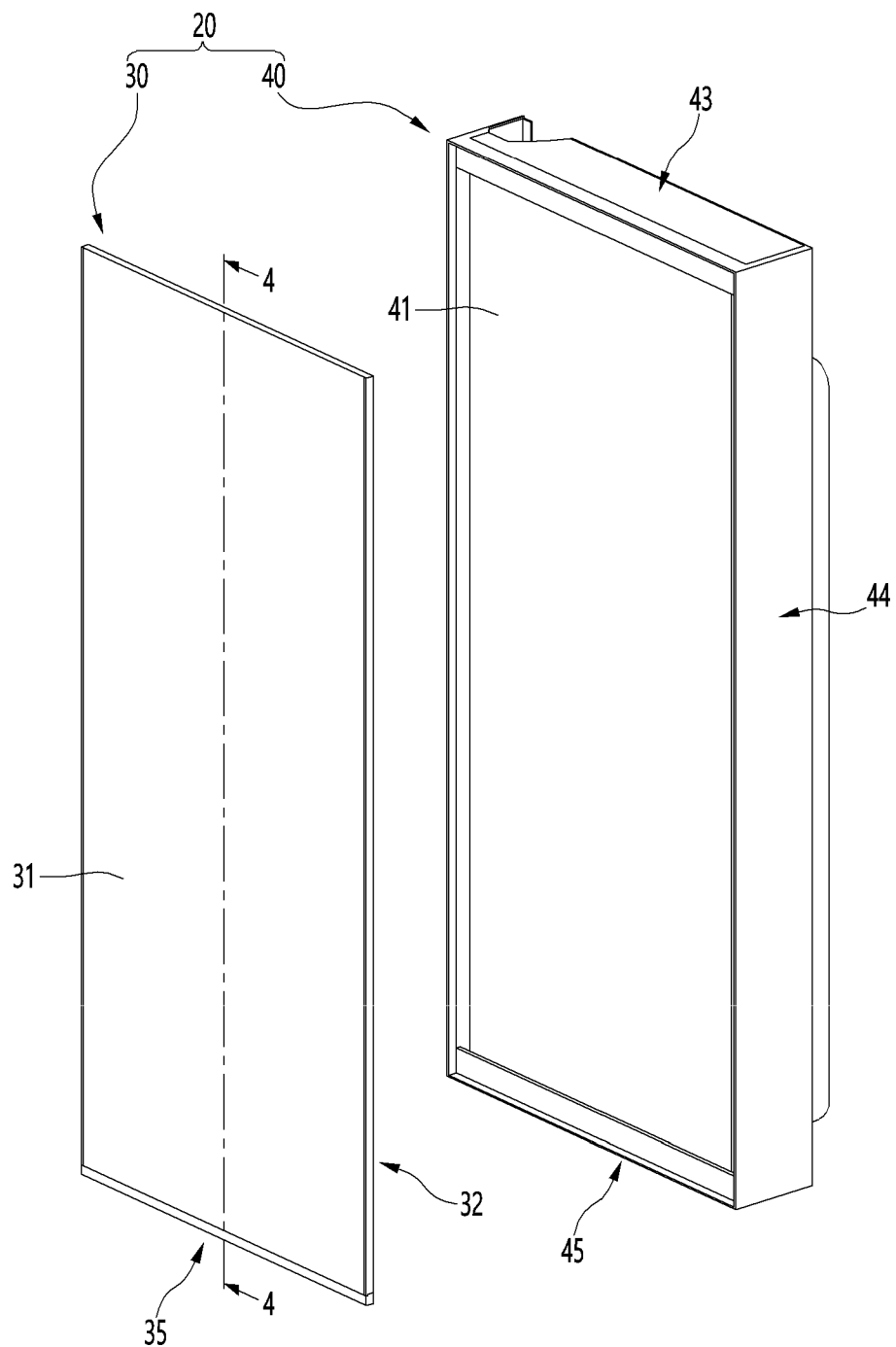
FIG. 3 is a view illustrating a state in which a panel assembly is separated from the refrigerator door.

FIG. 2 is a perspective view of a refrigerator door according to an embodiment present disclosure. FIG. 3 is a view illustrating a state in which a panel assembly is separated from the refrigerator door.

As illustrated in FIGS. 2 and 3, the door 20 may include a door body 40 forming the overall shape of the door 20, and a panel assembly 30 forming a front appearance of the door 20. That is, the door 20 may be configured in such a way that the panel assembly 30 is mounted on a front surface of the door body 40.

The door body 40 may include a body plate 41 defining a front surface and a door liner 42 defining a, rear surface.

The body plate 41 may be formed of a metal material and may be formed in a plate shape having a size corresponding to the panel assembly 30. The door liner 42 may be formed of a plastic material and may form a bottom shape of the door 20.

The door body 40 may further include a side decoration 44 forming right and left side surfaces of the door body 40.

The side decoration 44 may connect right and left side ends of the body plate 41 and right and left side ends of the door liner 42.

The door body 40 may include an upper cap decoration 43 and a lower cap decoration 45 that form top and bottom surfaces of the door body 40. The upper cap decoration 43 may be connected to an upper end of the side decoration 44, an upper end of the body plate 41, and an upper end of the door liner 42. The lower cap decoration 45 may be connected to a lower end of the side decoration 44, a lower end of the body plate 41, and a lower end of the door liner 42.

An outer appearance of the door body 40 may be formed by the body plate 41, the door liner 42, the side decoration 44, the upper cap decoration 43, and the lower cap decoration 45.

An insulator may be filled in an internal space of the door body 40, which is formed by coupling the body plate 41, the door liner 42, the side decoration 44, the upper cap decoration 43, and the lower cap decoration 45, and may provide an insulation structure to prevent heat from being transferred through the door 20. The insulator may be formed, for example, as a time elapses after a foaming liquid is filled. The door body 40 may be provided with an injection hole for filling the foaming liquid.

An opened forward panel receiving space 410 may be formed on a front surface of the door body 40. That is, front ends of the side decoration 44, the upper cap decoration 43, and the lower cap decoration 45 may protrude more forward than the front surface of the body plate 41.

A panel receiving space 410 that is opened forward may be defined at a front side of the door body 40. The panel receiving space 410 may be formed with a size corresponding to the size of the panel assembly 30 and the panel assembly 30 may be inserted into the panel receiving space 410. A circumference of the panel assembly 30 may be supported by a circumferential surface of the panel receiving space 410, that is, protruding portions of the side decoration 44, the upper cap decoration 43, and the lower cap decoration 45.

The panel assembly 30 may be formed in a plate shape as a whole and may be formed with a size corresponding to a front surface of the door body 40. Thus, when the panel assembly 30 is mounted on the front surface of the door body 40, the panel assembly 30 may shield the front surface of the door body 40 and may form an outer appearance of the front surface of the door 20. Since the panel assembly 30 may form the outer appearance of the front surface of the door 20, the panel assembly 30 may be referred to as a door panel, and since the panel assembly 30 may form the outer appearance of the front surface of the refrigerator 1, the panel assembly 30 may also be referred to as an exterior panel.

In the state in which the panel assembly 30 is mounted on the door body 40, a rear surface of the panel assembly 30 may be fixed in contact with the body plate 41. To fixedly mount the panel assembly 30, a lower end of the panel assembly 30 may be caught and restrained with a lower end of the lower cap decoration 45, and an upper end of the panel assembly 30 may be coupled to an upper end of a front surface of the upper cap decoration 43 to firmly couple the panel assembly 30 to the door body 40. The panel assembly 30 may be detachably mounted from the door body 40 for services and maintenance.

A front surface of the panel assembly 30 may be exposed forward in the state in which the panel assembly 30 is mounted on the door body 40, and the panel assembly 30 may substantially form the outer appearance of the front surface of the door 20. The panel assembly 30 may be configured to emit light from an entire front thereof and may be configured to glow with various colors.

To this end, a lighting device 36 may be provided inside the panel assembly 30. A wire (not shown) may be connected to the lighting device 36 in order to supply and control power. The wire (not shown) may be exposed outside the rear surface of the panel assembly 30, and a connector (not shown) may be provided on an end of the wire (not shown).

A structure connected to the connector of the wire to supply power to the lighting device 36 may be provided on a front surface of the door body 40.

Hereinafter, the structure of the panel assembly 30 will be described in more detail with reference to drawings.

Figure 5:
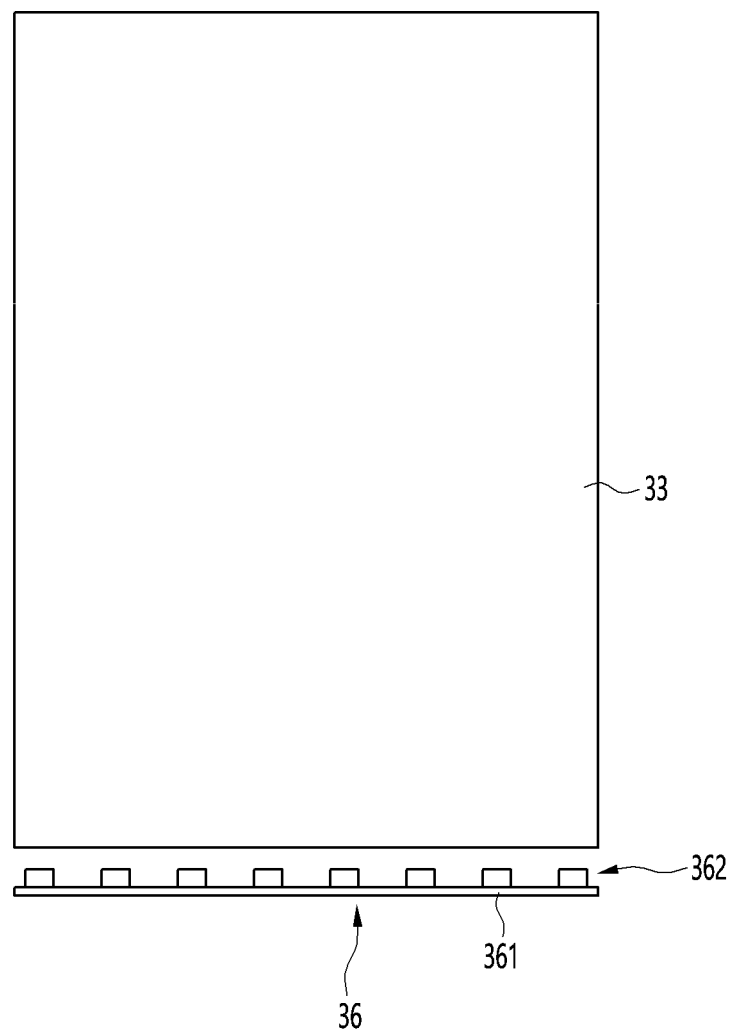
FIG. 5 is a view illustrating arrangement of a light guide plate and a light source.

FIG. 4 is a cross-sectional view taken along line 4-4 of FIG. 3. FIG. 5 is a view illustrating arrangement of a light guide plate and a light source.

Referring to FIGS. 4 and 5, the panel assembly 30 may include a front plate 31 forming an outer appearance of the front surface, the lighting device 36 for emitting light to cause the front plate 31 to glow, a light guide plate 33 for guiding the light emitted from the lighting device 36.

The panel assembly 30 may further include a diffusion member 32 allowing the light guide plate 33 to be spaced apart from the front plate 31 and diffusing the light. The diffusion member 32 may also be referred to as a support member in terms of supporting the light guide plate 33.

The lighting device 36 and the light guide plate 33 may be mounted or supported on the diffusion member 32.

The panel assembly 30 may further include a back cover 39 defining a rear surface of the panel assembly 30.

The front plate 31 may be formed in a rectangular plate shape and may be formed of a material that transmits light therethrough. For example the front plate 31 may be formed of a glass material such as blue glass, white glass, and vapor deposition glass or may be formed of other materials for transmitting light therethrough, such as acrylonitrile butadiene styrene (ABS), poly methyl methacrylate (PMMA), or polycarbonates (PC). The front plate 31 may be referred to as a transparent plate or an out plate.

The front plate 31 may be formed to be transparent to allow light reflected by the light guide plate 33 to be transmitted. In this case, transparency may be defined to a degree to which light reflected from the light guide plate is transmitted and emitted to the outside.

The front plate 31 may be formed to have color and may be formed to represent different colors depending on an operation or on and off states of the lighting device 36. For example, a specific design or pattern may be printed on the front plate 31 to have specific color. A film with a specific design or pattern printed thereon may be added to the front plate 31, surface treatment such as imprinting, etching, and glass printing may be performed on the front plate 31, or a coating or deposition layer having specific color and texture may be formed to form an outer appearance of the front plate 31.

The front plate 31 may be configured to transmit light emitted from the lighting device 36 but components behind the front plate 31 may not be seen therethrough. That is, in the state in which the lighting device 36 is turned off, components inside the panel assembly 30 may be prevented from being seen to the outside through the front plate 31 due to the color of the front plate 31.

In this case, a color layer having color may be formed on the front plate 31. In an off state of the lighting device 36, the color layer may be formed to have at least color having brightness equal to or greater than 0 other than black. That is, in a state in which the refrigerator 1 is installed, the front surface of the refrigerator 1 may be displayed in a color other than black, and the front color of the refrigerator may be changed according to an operation of the lighting device 36.

In the panel assembly 30, the entire front surface of the front plate 31 may be exposed to the outside. Thus, the light diffused by the diffusion member 32 may be transmitted through the front plate 31 as a whole, and thus, the entire front surface of the front plate 31 may glow.

A rear surface of the front plate 31 may be coupled to a front surface of the diffusion member 32.

The light guide plate 33 may be positioned at a rear spaced apart from the front plate 31 by the diffusion member 32 and may be configured to guide light emitted from the lighting device 36 disposed at the upper end of the light guide plate 33 forward.

For example, the light guide plate 33 may be formed of transparent acrylic, plastic, or a transparent polymer material. The light guide plate 33 may have a diffusing agent added thereto for diffusing light entrance on the light guide plate 33 or a pattern for diffusing light may be further formed on the light guide plate 33. Thus, light may be transferred to the front plate 31 by the light guide plate 33, and in this case, a pattern of the light guide plate 33 may be set to cause the entire front surface of the front plate 31 to glow with uniform brightness.

A load of the light guide plate 33 may be supported by the diffusion member 32 and a front surface of the light guide plate 33 may be pressed toward the diffusion member 32 by the back cover 39.

The diffusion member 32 may be disposed between the front plate 31 and the light guide plate 33. The diffusion member 32 may allow the light guide plate 33 to be maintained at a predetermined distance from the front plate 31 and may diffuse light emitted from the light emission surface of the light guide plate 33.

The front surface of the diffusion member 32 may support the front plate 31 and opposite side surfaces of the diffusion member 32 may restrain both ends of the light guide plate 33. The front surface of the diffusion member 32 may have a size greater than or equal to that of the light guide plate 33, and in the state in which the light guide plate 33 is mounted, the rear surface of the diffusion member 32 and the light guide plate 33 may be maintained in the state of being in surface contact with each other.

The diffusion member 32 may include a plate-shaped front surface portion 321, on which the front plate 31 is mounted, and an extension portion extending from a circumference of the front surface portion 321. The front surface portion 321 and the extension portion may define an accommodation space 320a in which the light guide plate 33 is disposed.

The extension portion is disposed to cover the circumference of the light guide plate 33. The circumference of the light guide plate 33 may include, for example, a top surface, a bottom surface, and both side surfaces.

For example, the extension portion may include an upper extension portion 322 extending from an upper end of a rear surface of the front surface portion 321, a lower extension portion 324 extending from a lower end of the rear surface of the front surface portion 321, and a pair of side surface portions extending from both left and right ends of the front surface portion 321.

The upper extension portion 322, the lower extension portion 324, and the pair of side surface portions may define the accommodation space 320a in which the light guide plate 33 is disposed. Thus, the diffusion member 32 not only serves to diffuse light, but also serves to accommodate and support the light guide plate 33.

The front surface portion 321 may be formed like a plate corresponding to the front plate 31, and a front surface of the light guide plate 33 may be in close contact with a rear surface of the front surface portion 321.

According to this embodiment, since the front surface portion 321 of the diffusion member 32 is entirely disposed between the front plate 31 and the light guide plate 33, even if the light guide plate 33 is deformed by the heat, the light guide plate 33 may be prevented from being in direct contact with the front plate 31. Thus, it is possible to prevent a dark area such as stains from occurring on the front plate 31.

The front surface portion 321 and the rear surface of the front plate 31 may be coupled to each other by an adhesion portion 313. The adhesion portion 313 may include, for example, a sealant or a double-sided tape.

The side surface portions may extend backward from right and left side ends of the front surface portion 321 and may be formed to restrain right and left side ends of the light guide plate 33. The side surface portions may be spaced apart from at least one of both left and right side surfaces of the light guide plate 33. When the light guide plate 33 moves to left and right sides, the side surface portions may be in contact with at least one surface of both the left and right side surfaces to restrict the at least one surface. When it is considered that the light guide plate 33 is expanded by heat, the side surface portions may be spaced apart from at least one of the left and right side surfaces of the light guide plate 33.

Each of the upper extension portion 322 and the lower extension portion 324 extends backward from the front surface portion 321, and a length of each of the upper extension portion 322 and the lower extension portion 324 is greater than a thickness of the light guide plate 33.

The diffusion member 32 may be made of a material for transmitting light therethrough and may be entirely formed by injection or extrusion as a single component.

The diffusion member 32 may be made of a transparent or translucent material as a whole. The diffusion member 32 itself may be provided to have a color. Thus, when viewed from the front of the panel assembly 30, a color, texture, or shape of the front surface of the panel assembly 30 may be determined by the diffusion member 32.

The diffusion member 32 may further include a light guide plate support 326 supporting a bottom surface 333 of the light guide plate 33. The light guide plate support 326 may extend backward from the rear surface of the front surface portion 321 and may be disposed above the lower extension portion 324 to be spaced apart from the lower extension portion 324.

To stably support the load of the light guide plate 33, the diffusion member 32 may include a plurality of light guide plate supports 326. The plurality of light guide plate supports 326 may be disposed to be spaced apart from each other in the horizontal direction.

The lighting device 36 may be accommodated in the diffusion member 32. The diffusion member 32 may include a receiving groove 324a (or receiving portion) that receives a portion of the lighting device 36.

The receiving groove 324a may be defined as a rear portion of the front surface portion 321 is recessed forward. Thus, the portion in which the receiving groove 324a is defined in the front surface portion 321 may be thinner than other portions.

The receiving groove 324a may be defined between the light guide plate support 326 and the lower extension portion 324. Thus, when the lighting device 36 is received in the receiving groove 324a, the lighting device 36 may be disposed below the light guide plate support 326.

The lighting device 36 may include a substrate 361 and the light source 362. The substrate 361 may be provided in a plate shape to be elongated in the left and right direction.

The plurality of light sources 362 may be arranged at a constant interval on the substrate 361. The light source 362 may be disposed to radiate light toward the bottom surface 333 of the light guide plate 33. That is, the bottom surface 333 of the light guide plate 33 is a light entrance surface, and the front surface 331 of the light guide plate 33 is the light emission surface.

The light source 362 may be disposed to emit light toward the lower end of the light guide plate 33.

The light source 362 may be disposed vertically below the bottom surface 333 of the light guide plate 33, i.e., may be disposed to face the bottom surface 333 of the light guide plate 33.

The light source 362 may be provided as, for example, an LED. The light source 362 may be configured as an RGB LED capable of emitting light with various colors according to a control of the controller 13, which will be described later. That is, the light source 362 may emit light with various colors under control of the controller 13 that will be described later, and thus the front plate 31 may glow with color set by the controller 13. A color of the front appearance of the refrigerator 1 may be determined according to color of the front plate 31.

The light source 362 may include an LED for emitting light with specific color other than the RGB LED and may include a combination of a plurality of LEDs for emitting light with different colors. For example, the plurality of light sources 362 may include red, green, and blue LEDs and may sequentially and repeatedly arranged. Under control of the controller 13, operations of the light sources 362 may be combined to cause the front plate 31 to glow with desired color.

An interval between the light sources 362 may be smaller than the right and left width of the light guide plate support 326, and thus the light guide plate support 326 may be disposed between the light sources 362. Thus, the light emitted from the light source 362 may pass between two adjacent light guide plate supports 326 and be emitted to the bottom surface 333 of the light guide plate 33.

The panel assembly 30 may further include a substrate supporter 37 seated on the lower extension portion 324 of the diffusion member 32.

The substrate supporter 37 may support the substrate 361 while being seated on the lower extension portion 324. A substrate supporter 37 may dissipate heat generated by the lighting device 36 by thermal conduction.

The substrate supporter 37 may be made of, for example, a metal material. For example, the substrate supporter 37 may be made of an aluminum material having high thermal conductivity. The substrate supporter 37 may be extruded with a metal material to have the same cross-sectional shape in the longitudinal direction.

A portion of the substrate supporter 37 may be received in the receiving groove 324a. The substrate supporter 37 may be in contact with the back cover 39 while the back cover 39 is assembled. Thus, the heat generated by the lighting device 36 may be transferred toward the back cover 39 through the substrate supporter 37 and may be dissipated through the back cover 39.

The panel assembly 30 may further include a rear supporter 34 supporting the rear surface of the light guide plate 33. The rear supporter 34 may be provided in a plate shape and may be attached to the rear surface of the light guide plate 33 by an adhesive.

The rear supporter 34 may be made of an opaque material through which light transmission is restricted. The rear supporter 34 may be accommodated in the accommodation space 320a defined by the diffusion member 32. The upper extension portion 322 may cover an upper side of the rear supporter 34, and the side portions 327 and 328 may cover both the side surfaces of the rear supporter 34.

A bottom surface of the rear supporter 34 may be disposed above the substrate 361. For example, a bottom surface of the rear supporter 34 may be seated on a top surface of the substrate 361.

In this case, the upward movement of the substrate 361 may be restricted by the rear supporter 34. Since the bottom surface 333 of the light guide plate 33 is seated on the top surface of the light guide plate support 226, a set interval may be maintained between the bottom surface of the light guide plate 33 and the light source 362.

As described above, the lighting device 36 may be maintained in the fixed state, and a distance between the light guide plate 33 and the light source 362 may also be maintained at a set distance, and thus, the light emitted from the light source 362 may be incident into the light guide plate 33 at a designed angle. Thus, the light emitted from the light source 362 may be effectively emitted toward the light guide plate 33, and the light reflected through the light guide plate 33 may allow the front plate 31 to glow with set brightness.

In another aspect, the rear supporter 34 may be seated on the light guide plate support 326.

The rear supporter 34 may include an opening 342 through which a portion of the back cover 39 passes.

The back cover 39 may include a cover body 391 and a bent portion extending from an edge of the cover body 391 in the horizontal direction.

The cover body 391 may be in contact with the rear surface of the rear supporter 34. The cover body 391 may be attached to the rear supporter 34 by the adhesive or may be coupled to the rear supporter 34 by a coupling member such as a screw.

The bent portion may extend forward from the edge of the cover body 391 and may include an upper bent portion 393, a lower bent portion 396, and a pair of side bent portions. The bent portion may be in contact with the diffusion member 32. For example, the bent portion may adhere to the extension portion of the diffusion member 32 by the adhesive.

For example, the upper bent portion 393 may be seated in an upper seating groove 323 having a recessed shape defined in the upper extension portion 322 of the diffusion member 32.

The lower bent portion 396 may be in contact with a bottom surface of the lower extension portion 324 of the diffusion member 32. The side bent portions may be seated in the recessed side seating grooves defined in the side extension portions.

In this embodiment, since the diffusion member 32 supports the light guide plate 33 and fixes a position of the light guide plate 33, and the back cover 39 is coupled to surround a portion of the diffusion member 32, the number of components of the panel assembly 30 itself may be reduced to reduce a thickness of the panel assembly in the front and rear direction.

The cover body 391 may further include a pressing portion 392 bent toward the light guide plate 33. The pressing portion 392 may pass through the opening 342 of the rear supporter 34 so as to be in contact with the rear surface of the light guide plate 33.

In this embodiment, the cover body 391 may press the rear supporter 34 toward the rear surface side of the light guide plate 33 while being in contact with the rear surface of the rear supporter 34, and the pressing portion 392 may directly press the light guide plate 33.

The receiving groove 324a may be defined at a position equal to or lower than that of the bottom surface 311 of the front plate 31. That is, a portion of the front surface portion 321 may extend further downward than the bottom surface 311 of the front plate 31.

The diffusion member 32 may diffuse the light emitted from the light emission surface of the light guide plate 33. Since a portion of the diffusion member 32 is disposed lower than the bottom surface 311 of the front plate 31, there is a possibility that the light passing through the diffusion member 32 is directly emitted to the outside without passing through the front plate 31. To prevent this phenomenon, the panel assembly 30 according to this embodiment may further include a lower trim 35.

The lower trim 35 may be coupled to the diffusion member 32 by a coupling means such as an adhesion portion or a hook.

The lower trim 35 may include a first portion 351 extending in the vertical direction and a second portion 352 extending in the horizontal direction from a lower end of the first portion 351.

At least the first portion 351 may be provided to be transparent or translucent and, as necessary, may be provided with a specific color.

The first portion 351 may cover a portion of the diffusion member 32 extending downward from the bottom surface 311 of the front plate 31. For example, the first portion 351 may be disposed to face the receiving groove 324a in front of the receiving groove 324a in the diffusion member 32.

The second portion 352 may support the lower extension portion 324. The second portion 352 may include a seating groove 353 for seating the lower bent portion 396 of the back cover 39.

Figure 7:
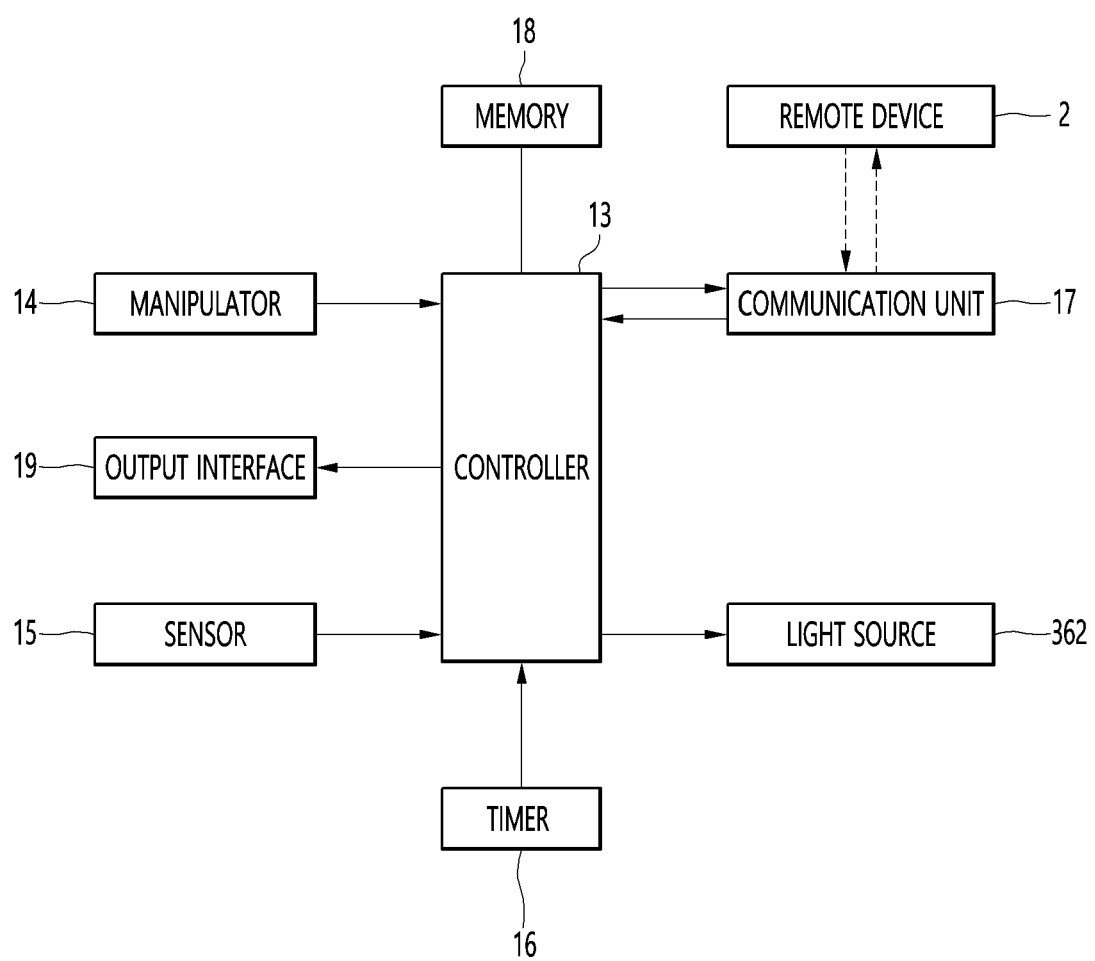
FIG. 7 is a block diagram illustrating a flow of a control signal of the refrigerator.
Figure 8:
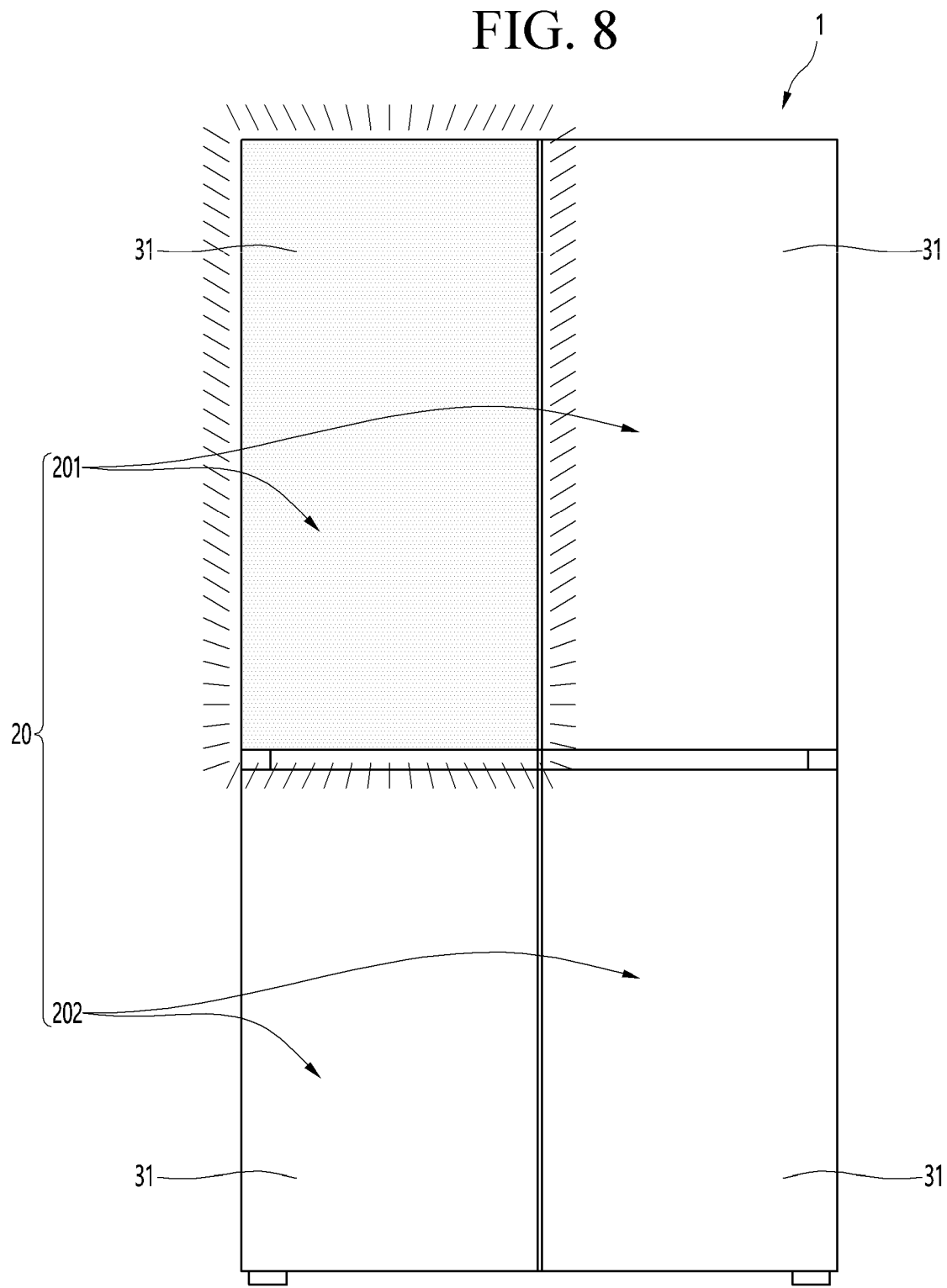
FIG. 8 is a view illustrating a state in which all doors glow in a refrigerator.
Figure 9:
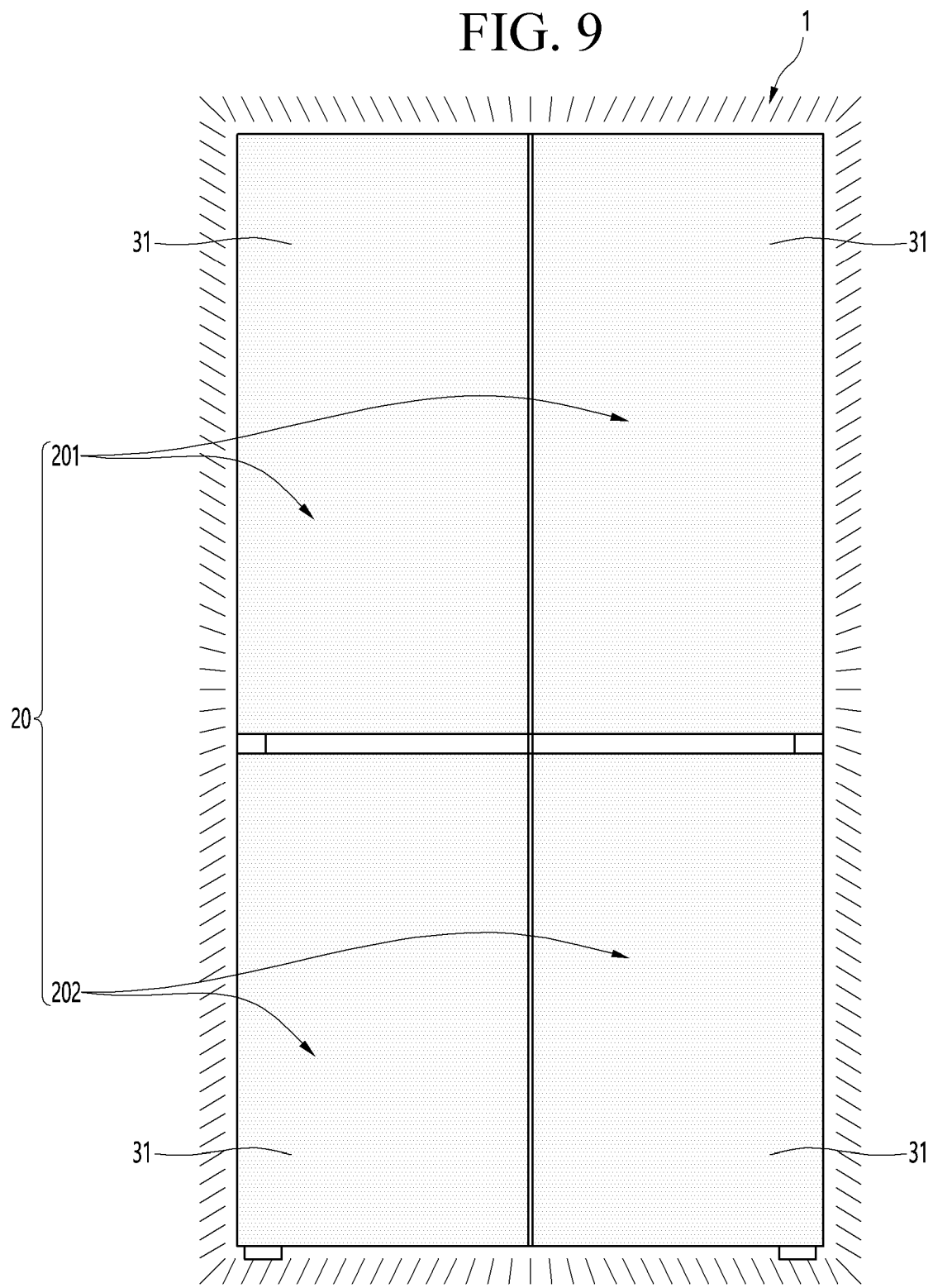
FIG. 9 is a view illustrating a state in which some doors of a plurality of doors glow.

FIG. 6 is a vertical cross-sectional view showing a light emitting state of the panel assembly. FIG. 7 is a block diagram illustrating a flow of a control signal of the refrigerator. FIG. 8 is a view illustrating a state in which all doors glow in a refrigerator. FIG. 9 is a view illustrating a state in which some doors of a plurality of doors glow.

Referring to FIGS. 6 to 9, in the refrigerator 1 according to an embodiment of the present disclosure, a front surface of the door 20 may glow via an operation of the lighting device 36.

The front surface of the door 20 may glow with any one of a plurality of colors under control of the controller 13.

The operation of the lighting device 36 may be performed by manipulation of a manipulator 14 of a user. The manipulator 14 may be disposed at one side of the refrigerator 1, and for example, may be disposed at one side of the cabinet 10. Needless to say, as necessary, the manipulator 14 may be included in the door 20 or manipulation may be input by touching and manipulating the front plate 31. That is, the user may directly manipulate the manipulator 14 to set an operation of the lighting device 36 and may turn on or off the lighting device 36.

The user may set an operation state of the lighting device 36, such as an operation time and an operation condition of the lighting device 36 and emission color of the light source 362 through manipulation of the manipulator 14.

Various commands related to an operation of the refrigerator may be input through manipulation of the manipulator 14.

As necessary, the manipulator 14 may be configured as a display for information display and manipulation.

The lighting device 36 may also be manipulated in operation and set in operation condition through a remote device 2 spaced apart from the refrigerator 1. The refrigerator 1 may communicate with the remote device 2 through a communication unit 17 connected to a controller 13, and the user may control an operation of the lighting device 36 through the remote device 2.

The communication unit 17 may communicate with the remote device 2 and/or a server for managing the home appliance using various methods.

For example, the communication unit 17 may have a configuration for communication using at least one method of wired, wireless, or short distance communication (Bluetooth, Wi-Fi, Zigbee, and NFC). The remote device 2 may be various devices that are capable of communicating, such as a dedicated terminal, a mobile phone, a tablet, a portable PC, a desktop PC, a remote control, or a Bluetooth speaker.

The user may manipulate and set the operation state of the lighting device 36, such as an operation time and an operation condition of the lighting device 36 and emission color through manipulation of the remote device 2. For example, the lighting device 36 may be simply manipulated and set through an application or a dedicated program installed in a portable phone of the user.

The refrigerator 1 may further include a timer 16. The timer 16 may count an elapsed time after a specific event occurs.

The lighting device 36 may also be operated according to the detection result by a sensor 15.

The sensor may include a user detection sensor for detecting proximity of the user. For example, the user detection sensor may use various devices for detecting user approaching near the refrigerator, such as an infrared sensor, an ultrasonic sensor, or a laser sensor.

The user detection sensor may be disposed at various positions for detecting proximity of the user, such as one side of the cabinet 10 or one side of the door 20, and may be disposed at various positions for detecting proximity of the user. A plurality of sensors may be disposed at different positions.

Thus, when the user approaches the refrigerator 1 by a reference distance for use of the refrigerator 1, the user detection sensor 151 may detect this and may transfer a signal to the controller 13 to turn on the lighting device 36. When the user moves away from the refrigerator 1, the user detection sensor 151 may detect this and may transfer a signal to the controller 13 to turn off the lighting device 36.

The refrigerator may further include an output interface 19. The output interface 19 may include, for example, a speaker outputting sound. Voice, various sounds, or music may be output from the speaker. The output interface 19 may be provided on a door or a cabinet.

The speaker may operate by directly communicating with a remote device, and operation may be controlled by the controller 13.

The operation state of the lighting device operated by the controller is now described. As shown in FIG. 6, when the lighting device 36 is turned on according to an instruction of the controller 13, light emitted from the light source 362 may be directed toward the bottom surface 333 of the light guide plate 33 and then guided along the light guide plate 33.

In this case, the light guided by the light guide plate 33 may pass through the light emission surface and be diffused while passing through the front surface portion 321, and then, may pass through the front plate 31 and be transmitted to the outside. Thus, the entire front plate 31 may brightly glow, and the front surface of the door 20 may glow with a set brightness or color.

The lighting device 36 may be turned on to cause the front surface of the door 20 to glow brightly, and the front surface of the door 20 may glow with set color by light emitted from the light source 362. In this case, the front color of the door 20 may be different color or brightness from in the state in which the lighting device 36 is turned off.

That is, a color of the front surface of the door 20 may be seen as a color of the front plate 31, and the texture and pattern disposed on the front plate 31 may be seen. In this case, the color of the front plate 31 may be color with a brightness greater than 0 and may be formed in a color other than black. The color of the front surface of the door 20 in the state in which the lighting device 36 is turned may also be referred to as a first color (or background color).

Thus, the front surface of the door 20 may be seen with color of the front plate 31, and in this case, components inside the panel assembly 30 may be seen through the front plate 31 and may not be seen to the outside by the color of the front plate 31.

In this state, the lighting device 36 may be turned on, and when the lighting device 36 is turned on, the front surface of the door 20 may glow with color set by the controller 13.

The controller 13 may control the front surface of the door 20 to glow with a second color different from the first color. The controller 13 may control the light source 362 to glow with the second color.

In this case, color emitted from the light source 362 may be different from the second color. That is, since the front plate 31 includes first color, if light of the second color is emitted from the light source 362, the light may interact with the first color while passing through the front plate 31 to actually glow with a third color.

Accordingly, in the present embodiment, control of the light source 362 to allow the door 20 to glow with a specific color may mean control of color emitted from the light source 362 in consideration of the color itself of the front plate 31.

That is, in the state in which the light source 362 is turned on, color with which the door 20 glows may be color formed by mixing color itself of the front plate 31 and color of light emitted from the light source 362.

Some of the plurality of doors 20 forming the front appearance of the refrigerator 1 may emit light or the plurality of doors 20 may independently emit light to form the front appearance of the refrigerator 1 with set color.

The refrigerator 1 may be operated to cause some doors 20 of a plurality of doors to glow or glow with specific color. That is, all the lighting devices 36 included in the doors 20 may not be operated, but instead, only some of all the doors 20 may glow. For example, any one door 201a of the refrigerating compartment door 201 may glow.

As necessary, the left refrigerating compartment door 201a and the right refrigerating compartment door 201b may glow with different colors. At least two of the doors 20 may be sequentially changed in color and at least two of the doors 20 may be sequentially turned on or off.

In this case, the lighting device 36 included in the panel assembly 30 may be controlled by the controller 13 according to the aforementioned various conditions.

The refrigerating compartment door or the freezing compartment door among the doors may be controlled to glow with different colors.

The controller 13 may control the lighting device 36 to cause one pair of the refrigerating compartment doors 201 to be seen with the first color. The controller 13 may control the lighting device 36 to cause one pair of the refrigerating compartment doors 201 to be seen with the second color.

With respect to operation control of the lighting device 36 described below, the present disclosure is not limited to the configuration of the panel assembly or the door described above. That is, at least one of a plurality of components configuring the panel assembly may be omitted, at least one of a plurality of components may be replaced with another component, or the location of at least one component among a plurality of components may be changed.

In the present specification, a state change of the light source 362 may include one or more of a case in which the light source 362 is changed from an off state to an on state, a case in which the light source 362 is changed from an on state to an off state, a case in which one or more LEDs are turned on in a state in which the light source 362 is turned off, a case in which the light source 362 is turned off in a state in which one or more LEDs are turned on, a case in which brightness of light emitted from the light source 362 is changed in a state in which the light source 362 is turned on, a case in which the brightness or color of light emitted from some of a plurality of LEDs is changed in a state in which the light source 362 is turned on, the number of LED lights is changed (an increase in the number of LED lights or a decrease in the number of LED lights), and a case in which color of light emitted from the light source 362 is changed in a state in which the light source 362 is turned on.

The state in which the light source 362 is turned on may mean a state in which all of a plurality of LEDs are turned on, and the state in which the light source 362 is turned off may mean a state in which all of the plurality of LEDs are turned off.

Figure 10:
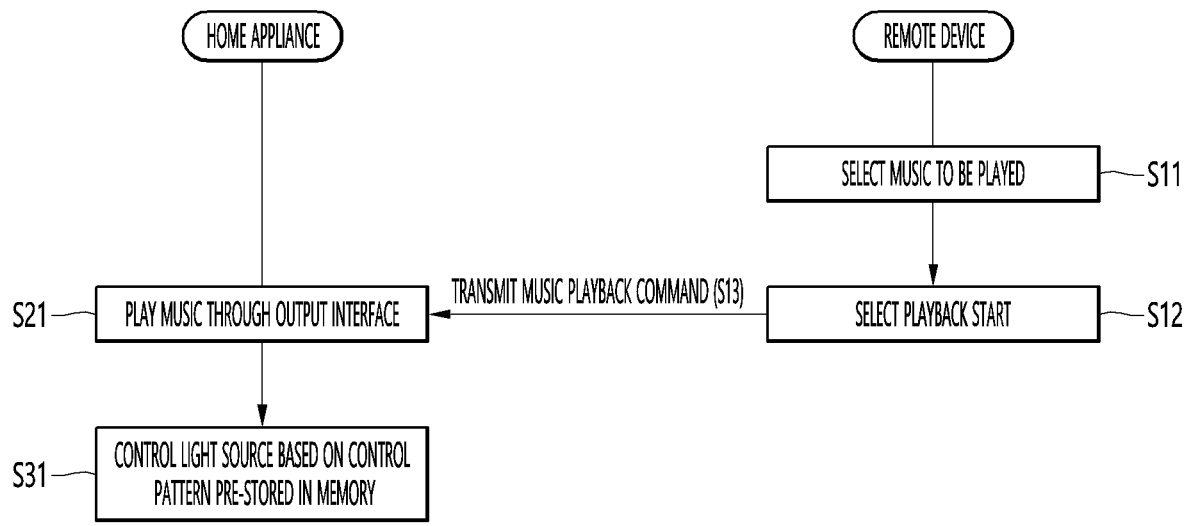
FIG. 10 is a flowchart illustrating a method of controlling a light source in association with music playback according to a first embodiment of the present disclosure.

FIG. 10 is a flowchart illustrating a method of controlling a light source in association with music playback according to a first embodiment of the present disclosure.

Referring to FIGS. 7 and 10, the refrigerator 1 may communicate with the remote device 2 and, when a user selects music to be played through the remote device 2, the output interface 19 of the refrigerator 1 may play the selected music and control the light source 362 in association with music playback. In this disclosure, a home appliance and a remote device may be referred to as a home appliance control system.

For example, music to be played may be selected through the remote device 2 (S11).

The user may select playback start through the remote device 2 (S12).

Then, the remote device 2 may transmit a music playback command to the refrigerator 1 (S13).

Since the remote device 2 and the refrigerator 1 may communicate through the communication unit 17, when the refrigerator 1 receives the music playback command from the remote device 2, the controller 13 plays the selected music through the output interface 19 (S21). That is, from the viewpoint of the remote device 2, the refrigerator 1 may serve as a Bluetooth speaker.

According to the present embodiment, since a home appliance such as a refrigerator may play music selected by the remote device, a user (multiple users) present in a space where the home appliance is located may listen to music.

The controller 13 may control the light source 362 based on a control pattern stored in the memory 18 in association with music playback.

That is, the light source 362 may operate while music is played through the output interface 19 of the refrigerator 1.

In the present embodiment, the light source 362 is turned on or off while music is played or one or more of an on time or off time of the light source or brightness and color when the light source is turned on may be changed.

For example, the number of LEDs which is turned on for each playback time, the position of the LED which is turned on, a lighting time, brightness, color information, etc. are separately stored in the memory as control information, and the controller 13 may control the light source 362 based on the control information according to the playback time. The color information may include R, G and B values of the LED.

For example, in the refrigerating compartment door 201, all LEDs may be repeatedly changed from a first color to a second color and from the second color to the first color. In the freezing compartment door 202, after all LEDs are turned on, the number of LEDs which is turned on may be repeatedly changed.

According to control of the light source 362, it is possible to aurally enjoy the played music and to visually enjoy music through a change in light.

In addition, operation of the light source 362, the refrigerator door may have a visual equalizing effect.

When one control pattern is stored in the memory 18, the light source 362 may be controlled with the same control pattern regardless of the type of the played music.

Alternatively, a plurality of control patterns may be stored in the memory 18. In this case, when a music playback command is received from the remote device 2, the controller 13 may select any one of the plurality of control patterns and control the light source 362 based on the selected control pattern. In this case, the controller 13 may arbitrarily select one of the plurality of control patterns.

The control pattern stored in the memory 18 may be deleted or changed (updated). In addition, additional control patterns may be stored in the memory 18.

The control pattern may include a control time of the light source 362. In this case, the light source 362 may be controlled during the control time regardless of the music playback time. Alternatively, the controller 13 may control the light source 362 while the output interface 19 operates.

Alternatively, the sensor 15 may include a sound sensor, and the controller 13 may control the light source 362 while the sound sensor detects sound of the output interface 19.

In the present embodiment, the controller 13 may control the light source 362 and the output interface 19. Alternatively, the controller 13 may include a first controller for controlling the output interface 19 and a second controller for controlling the light source 362.

Figure 11:
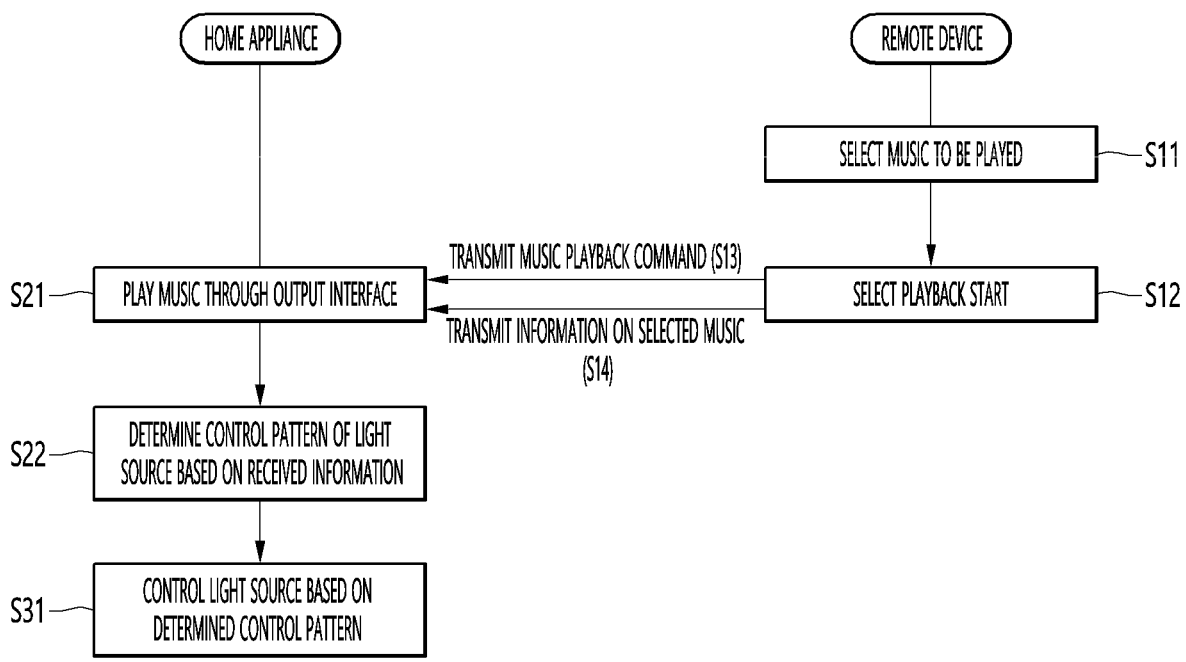
FIG. 11 is a flowchart illustrating a method of controlling a light source in association with music playback according to a second embodiment of the present disclosure.

FIG. 11 is a flowchart illustrating a method of controlling a light source in association with music playback according to a second embodiment of the present disclosure.

The present embodiment is the same as the first embodiment in other portions, but is different therefrom in control of the light source. Accordingly, only the characteristic portions of the present embodiment will be described below.

Referring to FIGS. 7 and 11, music to be played may be selected through the remote device 2 (S11).

A user may select playback start through the remote device 2 (S12).

Then, the remote device 2 may transmit a music playback command to the refrigerator 1 (S13). In addition, the remote device 2 may transmit information on the selected music to the refrigerator 1 (S14).

Since the remote device 2 and the refrigerator 1 may communicate through the communication unit 17, when the refrigerator 1 receives the music playback command from the remote device 2, the controller 13 plays the selected music through the output interface 19 (S21).

The controller 13 determines or selects a control pattern of the light source 362 based on information on the received music (S22).

For example, the information on music may include one or more genre information and beats per minute (BPM).

A plurality of control patterns matching one or more of genre information and BPM information may be stored in the memory 18.

For example, when information on the received music includes first genre information, the controller 13 may select a first control pattern matching a first genre from among the plurality of control patterns. On the other hand, when information on the received music includes second genre information, the controller 13 may select a second control pattern matching a second genre from among the plurality of control patterns.

Alternatively, when the information on the received music includes first BPM information, the controller 13 may select a third control pattern matching a first BPM from among the plurality of control patterns. On the other hand, when the information on the received music includes second BPM information, the controller 13 may select a fourth control pattern matching a first BPM from among the plurality of control patterns.

Alternatively, when the information on the received music includes first genre information and a first BPM, the controller 13 may select a fifth control pattern matching the first genre and the first BPM from among the plurality of control patterns. On the other hand, when the information on the received music includes first genre information and a second BPM, the controller 13 may select a sixth control pattern matching the first genre and the second BPM from among the plurality of control patterns.

Although not limited thereto, when the control pattern includes repetitive on and off of the LED, the on time and off time may be set to decrease as the BPM increases. That is, the blinking time of the LED when the BPM is large may be shorter than that of the LED when the BPM is small.

Although not limited thereto, when the control pattern includes a color change of the LED, a color change time may be set to decrease as the BPM increases.

That is, a color change period of the LED when the BPM is large may be shorter than that of the LED when the BPM is small or the number of LED color changes may be greater than the number of LED color changes when the BPM is small.

The controller 13 may control the light source 362 based on the determined control pattern (S31).

That is, the light source 362 may operate while music is played through the output interface 19 of the refrigerator 1, and the light source 362 may be controlled based on one or more of the genre of the played music and the BPM.

Figure 12:
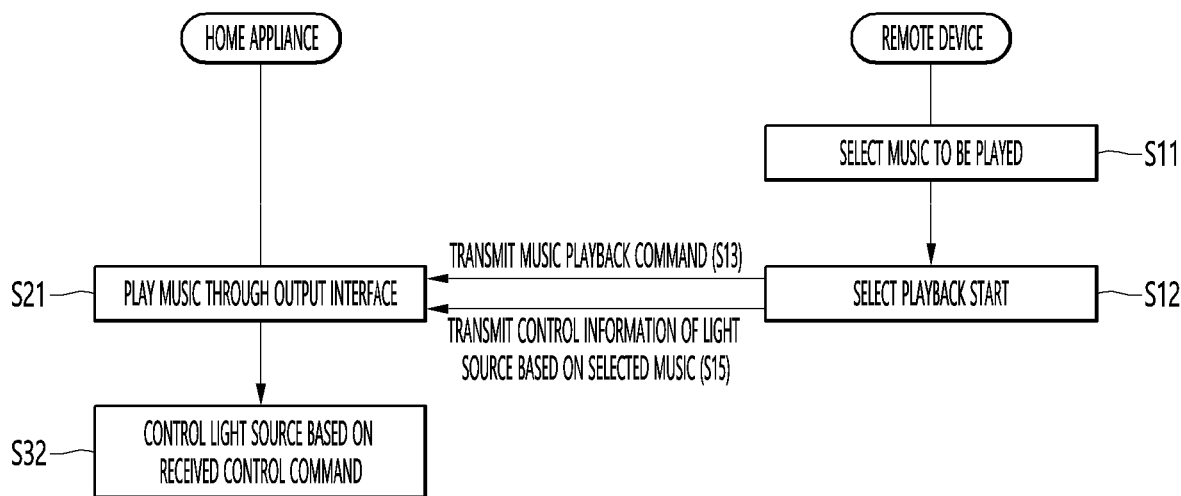
FIG. 12 is a flowchart illustrating a method of controlling a light source in association with music playback according to a third embodiment of the present disclosure.

FIG. 12 is a flowchart illustrating a method of controlling a light source in association with music playback according to a third embodiment of the present disclosure.

The present embodiment is the same as the first embodiment in other portions, but is different therefrom in control of the light source. Accordingly, only the characteristic portions of the present embodiment will be described below.

Referring to FIGS. 7 and 12, music to be played may be selected through the remote device 2 (S11).

A user may select playback start through the remote device 2 (S12).

Then, the remote device 2 may transmit a music playback command to the refrigerator 1 (S13). In addition, the remote device 2 may transmit control information of the light source based on the selected music to the refrigerator 1 (S14).

The control information of the light source has the same concept as a control pattern stored in the memory 18 in the above-described embodiment. In the above-described embodiment, since the control pattern is stored in the memory 18, the light source 362 may be controlled based on the stored control pattern. However, in this embodiment, the control information of the light source may be received from the remote device 2.

Since the remote device 2 and the refrigerator 1 may communicate through the communication unit 17, when the refrigerator 1 receives the music playback command from the remote device 2, the controller 13 plays the selected music through the output interface 19 (S21).

The received control information of the light source is stored in the memory 18 and the controller 13 controls the light source 362 based on the received control information of the light source (S32).

In the present embodiment, since the control pattern is not stored in the memory 18 in advance and the control information is received from the remote device 2 when music is played, the storage capacity of the memory 18 may be reduced.

Figure 13:
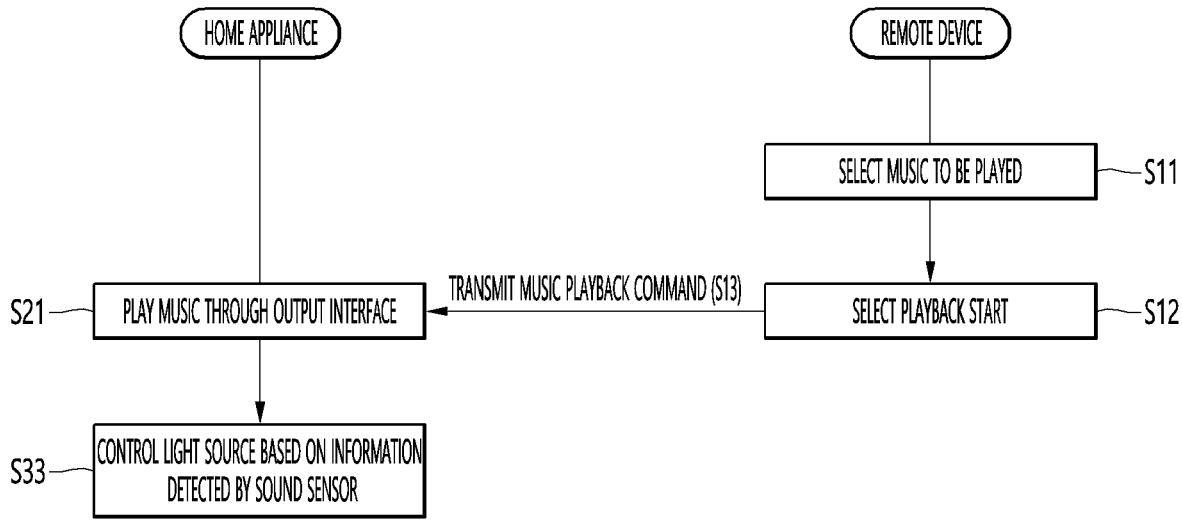
FIG. 13 is a flowchart illustrating a method of controlling a light source in association with music playback according to a fourth embodiment of the present disclosure.

FIG. 13 is a flowchart illustrating a method of controlling a light source in association with music playback according to a fourth embodiment of the present disclosure.

The present embodiment is the same as the first embodiment in other portions, but is different therefrom in control of the light source. Accordingly, only the characteristic portions of the present embodiment will be described below.

Referring to FIGS. 7 and 13, music to be played may be selected through the remote device 2 (S11).

A user may select playback start through the remote device 2 (S12).

Then, the remote device 2 may transmit a music playback command to the refrigerator 1 (S13).

Since the remote device 2 and the refrigerator 1 may communicate through the communication unit 17, when the refrigerator 1 receives the music playback command from the remote device 2, the controller 13 plays the selected music through the output interface 19 (S21).

When music is played through the output interface 19, the sound sensor of the sensor 15 may detect sound output from the output interface 19.

The controller 13 may control the light source 362 based on information detected by the sound sensor (S33).

For example, the controller 13 may control the light source 362 based on the level and/change pattern of the sound detected by the sound sensor.

In this case, control information of the light source corresponding to analyzed sound information may be stored in the memory 18, and control signal matching the level and/or change pattern of the sound detected by the sound sensor may be extracted by the controller 13 to control the light source 362.

Figure 14:
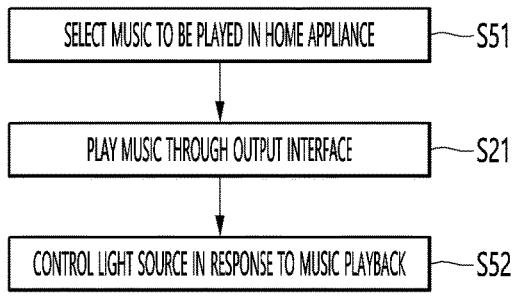
FIG. 14 is a flowchart illustrating a method of selecting music to be played in a home appliance and controlling a light source in association with the selected music according to the present embodiment.

FIG. 14 is a flowchart illustrating a method of selecting music to be played in a home appliance and controlling a light source in association with the selected music according to the present embodiment.

The present embodiment is the same as any one of the above-described embodiments in other portions, but is different therefrom in a music selection method. Accordingly, only the characteristic portions of the present embodiment will be described below.

Referring to FIGS. 7 and 14, music to be played may be selected through the manipulator 14 of the refrigerator (S51).

When the manipulator 14 (or an input interface) is a button, music playback or music to be played may be selected using a plurality of buttons. Alternatively, the refrigerator may further include a display capable of touch input and music playback and music to be played may be selected on the display.

When music to be played is selected, the controller 13 plays the selected music through the output interface 19 (S21).

The controller 13 may control the light source 362 based on a control pattern stored in the memory 18 in association with music played through the output interface 19.

That is, the light source 362 may operate while music is played through the output interface 19 of the refrigerator 1.

When one control pattern is stored in the memory 18, the light source 362 may be controlled with the same control pattern regardless of the type of the played music.

Alternatively, a plurality of control patterns may be stored in the memory 18. In this case, In this case, when a music playback command is received from the remote device 2, the controller 13 may select any one of the plurality of control patterns and control the light source 362 based on the selected control pattern. In this case, the controller 13 may arbitrarily select one of the plurality of control patterns.

The control pattern stored in the memory 18 may be deleted or changed (updated). In addition, additional control patterns may be stored in the memory 18.

As another example, a sound sensor for detecting sound output from the output interface 19 may be further included. The controller 13 may play music through the output interface 19 and control the light source based on sound information of the output interface detected by the sound sensor.

Figure 15:
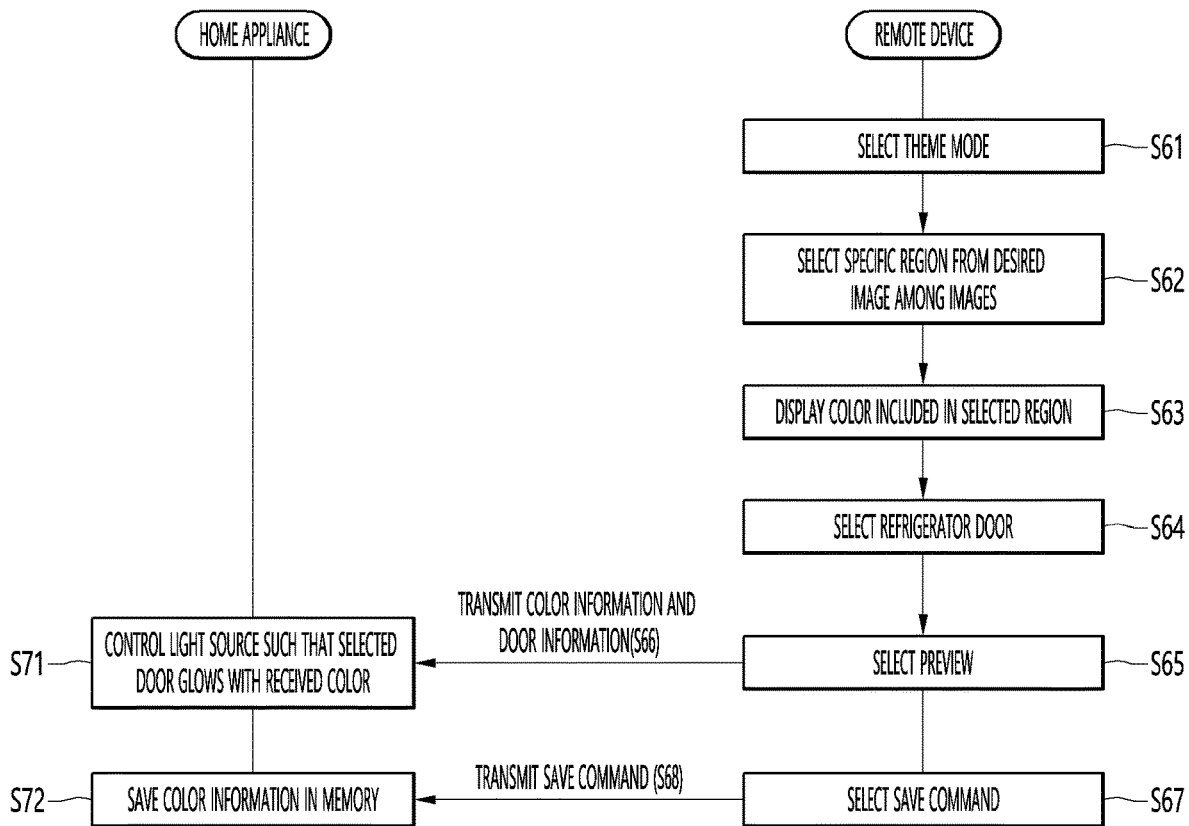
FIG. 15 is a view illustrating a first method of selecting a color of a refrigerator door according to the present embodiment.
Figure 16:
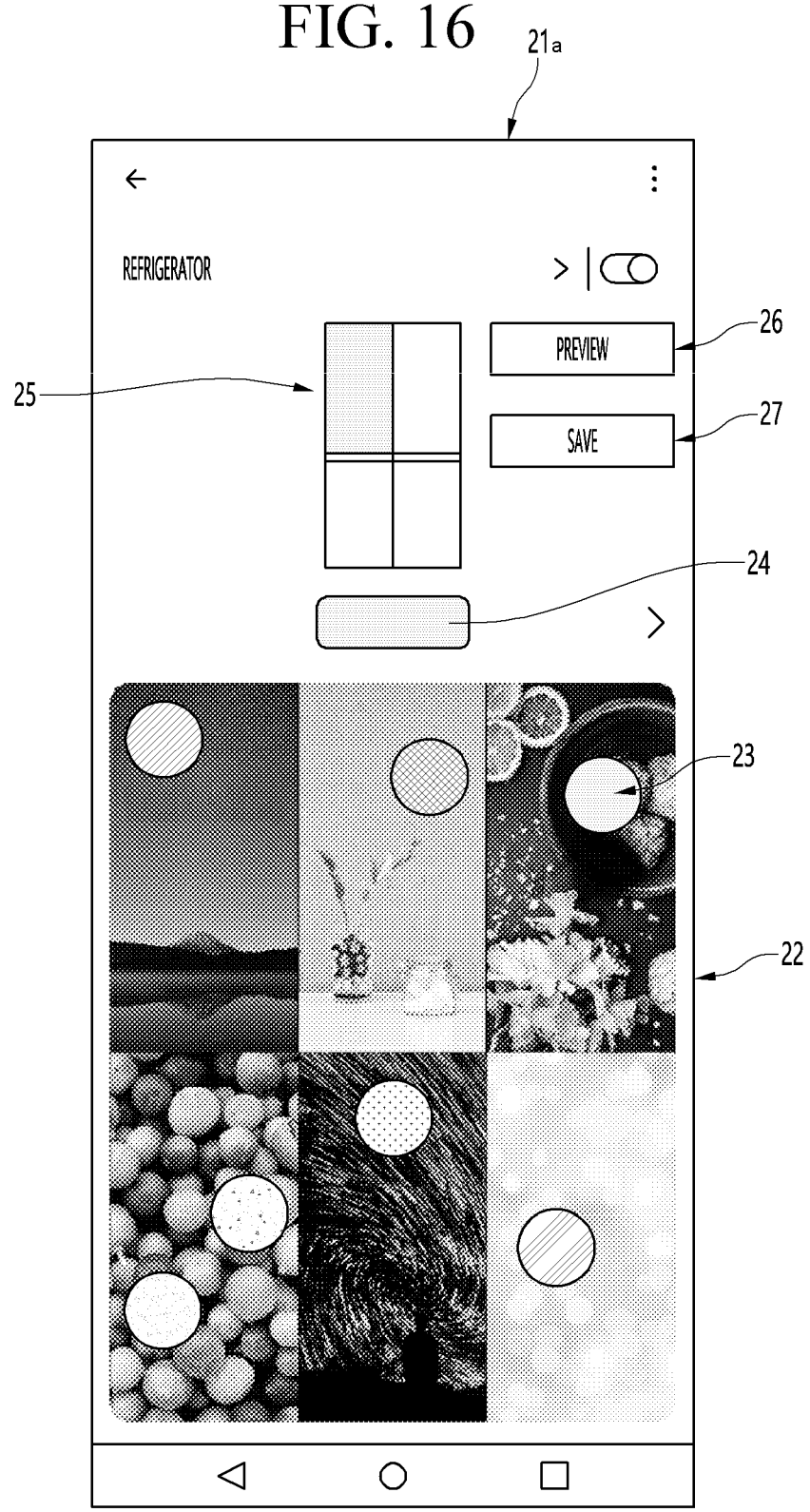
FIG. 16 is a view illustrating a screen displayed on a display of a remote device.

FIG. 15 is a view illustrating a first method of selecting a color of a refrigerator door according to the present embodiment, and FIG. 16 is a view illustrating a screen displayed on a display of a remote device.

In FIG. 16, it should be noted that a color varies by differences in the thickness, size, and shape of lines or dots within an area displaying each color of a color palette.

Referring to FIGS. 15 and 16, when a specific event occurs, the light source 362 may operate. When the light source 362 operates, the front surface of the refrigerator door may glow with a specific color.

In the present embodiment, when the specific event occurs, the user may select a specific color with which the refrigerator door glows. That is, the color with which the refrigerator door glows may vary according to the specific event.

Information on the color when the light source operates according to the specific event may be stored in the memory.

For example, a theme mode may be selected in the remote device 2 (S61). When the theme mode is selected, a screen 21a for selecting a specific color may be displayed on the display of the remote device 2.

A plurality of images 22 may be displayed on the screen 21a.

Each image 22 may have one or more colors. The image 22 may be, for example, a photograph.

The user may select a specific region 23 from a desired image among the images 22 displayed on the screen 21a (S62).

The specific region 23 may include one or more colors. When a plurality of colors is present in the specific region 23, a color having the largest area among the plurality of colors may be determined as a representative color.

A representative color 24 (first color) including the specific region 23 may be displayed on the screen 21a separately from the image 22 (S63).

A refrigerator-shaped icon 25 for selecting a door to which the selected color will be applied may be displayed on the screen 21a. The icon 25 may include, for example, a plurality of doors, and the shape of the icon 25 may be changed. That is, since the appearance of the refrigerator may be different, the user may change the shape of the icon 25 to match the shape of the icon 25 with that of the actual refrigerator.

The user may select a specific refrigerator door on the icon 25 (S64).

On the icon 25, the selected color (first color) may be displayed on the selected door.

A preview button 26 and a save button 27 may be displayed on the screen 21a. In order to confirm that the refrigerator door actually glows with the selected color, the user may select the preview button 26 (S65).

When the preview button 26 is selected, the remote device 2 may transmit information on the selected color and information on the selected door to the refrigerator 1 (S66). For example, the color information may include a value of each of R, G and B.

When the refrigerator receives the color information and the door information, the controller 13 may control the light source 362 so that the selected door glows with the selected color (first color) (S71).

That is, the controller 13 may control the light source 362 based on the received R, G and B values. In this case, the light source 362 may be turned off after being turned on for a set time.

The received R, G and B values may be equal to or different from the R, G and B values of the color with which the door actually glows.

As described above, light emitted from the light source 362 passes through the light guide plate 33 and then passes through the front plate 31. The color of light after passing through the front plate 31 may be different from that of light before passing through the front plate 31.

In the present embodiment, the R, G and B values received by the refrigerator 1 from the remote device 2 may be corrected R, G and B values (R, G and B values for the second value) such that the color after light passes through the front plate 31 matches the selected color displayed on the screen 21a.

The user may select the save button 27 (save command selection) (S67), in order to save the selected color.

Then, the remote device 2 may transmit the save command to the refrigerator 1 (S68), and the controller 13 may save the received color information (R, G and B values of the light source) in the memory 18 (S72) (color update).

In this case, when the color information matching a specific event is pre-stored in the memory 18, the pre-stored color information may be changed to the received color information.

In this case, when a specific event occurs later, the light source may be controlled so that the door glows with the updated color stored in the memory 18.

According to the present embodiment, the refrigerator door may glow with the selected color by selecting a color desired by the user from the images.

Figure 17:
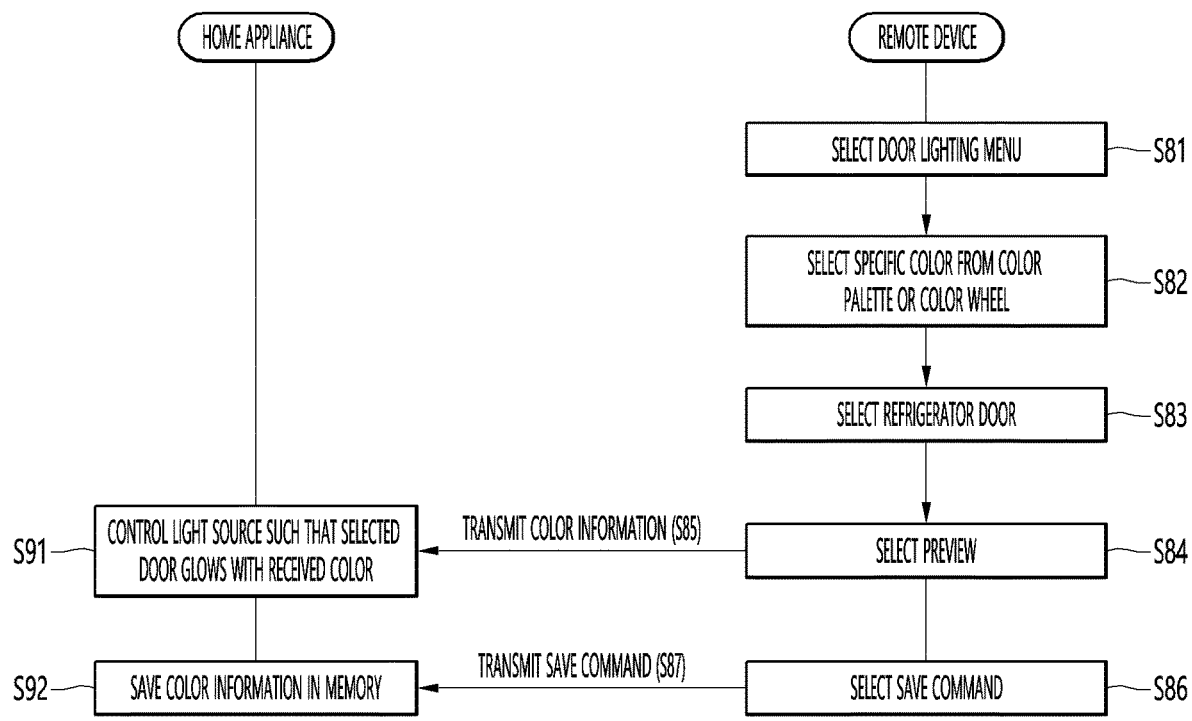
FIG. 17 is a view illustrating a second method of selecting a color of a refrigerator door according to the present embodiment.
Figure 18:
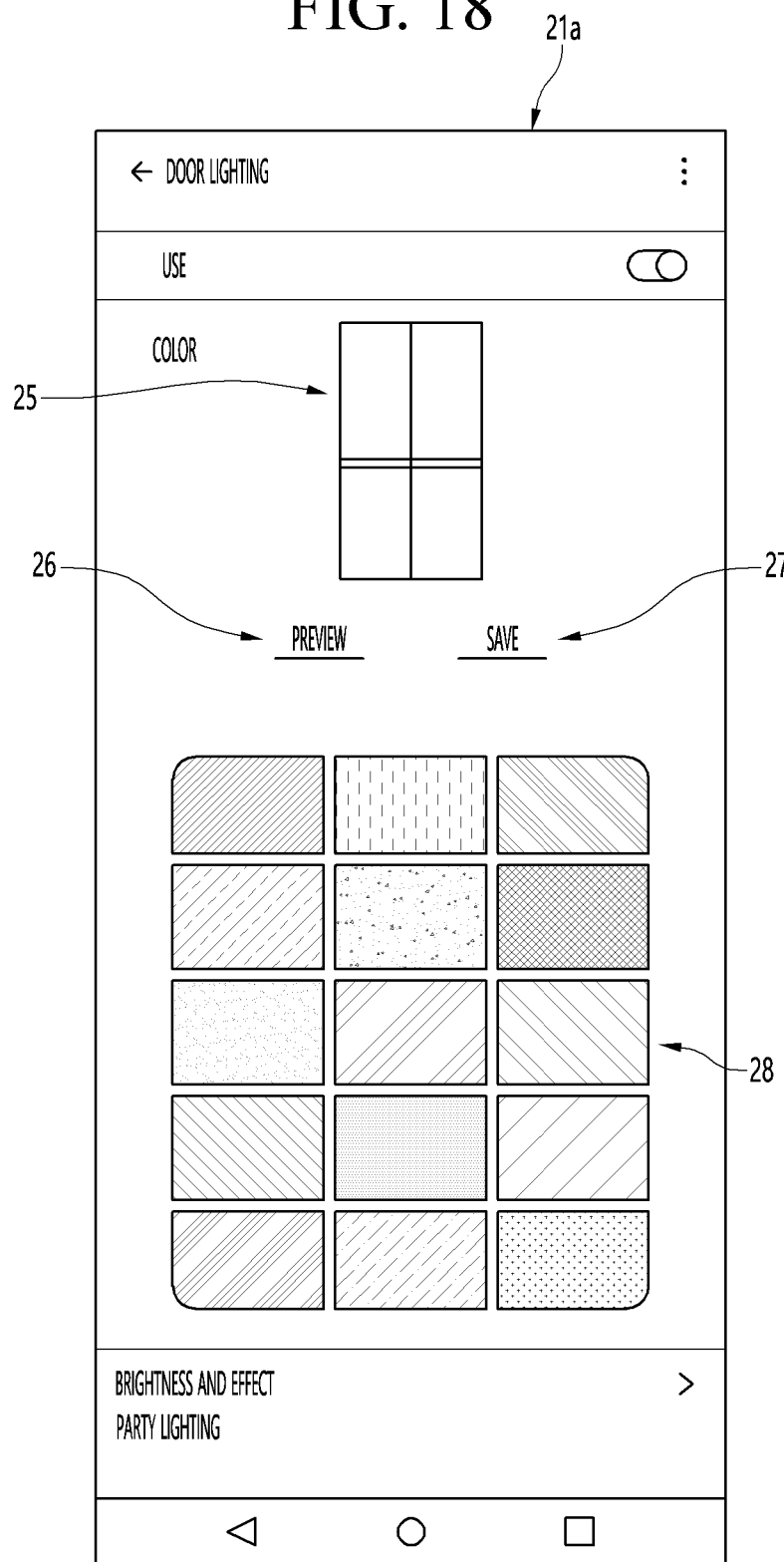
FIG. 18 is a view illustrating another screen displayed on a display of a remote device.

FIG. 17 is a view illustrating a second method of selecting a color of a refrigerator door according to the present embodiment, and FIG. 18 is a view illustrating another screen displayed on a display of a remote device.

In FIG. 18, it should be noted that a color varies by differences in the thickness, size, and shape of lines or dots within an area displaying each color of a color palette.

Referring to FIGS. 17 and 18, when a specific event occurs, the light source 362 may operate. When the light source 362 operates, the front surface of the refrigerator door may glow with a specific color.

In the present embodiment, when the specific event occurs, the user may select a specific color with which the refrigerator door glows.

For example, a door lighting menu may be selected in the remote device 2 (S81). When the door lighting menu is selected, a screen 21a for selecting a specific color may be displayed on the display of the remote device 2.

On the screen 21a, a color palette 28 or a color wheel may be displayed. The color palette 28 may separately display a plurality of different colors, and the color wheel may continuously display different colors in a circular shape. In the present disclosure, the color palette and the color wheel may be collectively referred to as a color selector.

The user may select a desired color from the color palette 28 or the color wheel displayed on the screen 21a (S82).

A refrigerator-shaped icon 25 for selecting a door to which the selected color will be applied may be displayed on the screen 21a. The icon 25 may include, for example, a plurality of doors, and the shape of the icon 25 may be changed. That is, since the appearance of the refrigerator may be different, the user may change the shape of the icon 25 to match the shape of the icon 25 with that of the actual refrigerator.

The user may select a specific refrigerator door on the icon 25 (S83).

A preview button 26 and a save button 27 may be displayed on the screen 21a. In order to confirm that the refrigerator door actually glows with the selected color, the user may select the preview button 26 (S84).

When the preview button 26 is selected, the remote device 2 may transmit information on the selected color and information on the selected door to the refrigerator 1 (S85). For example, the color information may include a value of each of R, G and B.

When the refrigerator receives the color information and the door information, the controller 13 may control the light source 362 so that the selected door glows with the selected color (first color) (S91). That is, the controller 13 may control the light source 362 based on the received R, G and B values. In this case, the light source 362 may be turned off after being turned on for a set time.

As described with reference to FIG. 15, in the present embodiment, the R, G and B values received by the refrigerator 1 from the remote device 2 may be corrected R, G and B values such that the color after light passes through the front plate 31 matches the selected color displayed on the screen 21a.

The user may select the save button 27 (save command selection) (S86), in order to save the selected color.

Then, the remote device 2 may transmit the save command to the refrigerator 1 (S87), and the controller 13 may save the received color information (R, G and B values of the light source) in the memory 18 (S92) (color update).

In this case, when a specific event occurs later, the light source may be controlled so that the door glows with the updated color stored in the memory 18.

According to an embodiment of the present disclosure, when a home appliance such as a refrigerator can play music selected by a remote device, a user (multiple users) present in a space where the home appliance is located can listen to music.

According to control of the light source, it is possible to aurally enjoy the played music and to visually enjoy music through a change in light.

Since method of controlling the light source is changed according to played music, it is possible to enjoy the played music with various visual feelings.

According to an embodiment of the present disclosure, when a control pattern is not stored in the memory in advance and light source control information is received from a remote device while reproducing music, the storage capacity of the memory of the home appliance may be reduced.

What is claimed is:

1. An appliance comprising:
  a cabinet that defines a storage space;
  a door configured to open and close at least a portion of the storage space, the door comprising (i) a front plate that defines an outer appearance of the door and (ii) a light source configured to emit light to thereby provide the light through the front plate;
  an output interface disposed at the cabinet or the door and configured to output a sound; and
  a controller configured to:
    identify a color that is preset to be associated with the sound, and
    control the light source to emit the light in the color and to change the color while the sound is output from the output interface,
  wherein the door further comprises:
    a light guide plate configured to guide the light from the light source, and
    a diffusion member disposed between the front plate and the light guide plate and configured to diffuse the light,
  wherein the diffusion member comprises:
    a front portion that is in contact with the light guide plate,
    an upper extension portion that extends from an upper side of a rear surface of the front portion, and
    a lower extension portion that extends from a lower side of the rear surface of the front portion, and
  wherein the light guide plate is positioned between the upper extension portion and the lower extension portion of the diffusion member.

2. The appliance of claim 1,
  wherein a front surface of the light guide plate is in contact with a rear surface of the diffusion member.

3. The appliance of claim 1, wherein the diffusion member further comprises a light guide plate support that is spaced apart from the lower extension portion and that supports the light guide plate.

4. The appliance of claim 1, wherein the door further comprises a back cover that is in contact with the diffusion member.

5. The appliance of claim 4, wherein the back cover comprises:
  a cover body;
  an upper bent portion that extends from the cover body and is in contact with the upper extension portion of the diffusion member; and
  a lower bent portion that extends from the cover body and is in contact with the lower extension portion of the diffusion member.

6. The appliance of claim 5, wherein the upper extension portion of the diffusion member defines an upper seating groove that supports the upper bent portion of the back cover.

7. The appliance of claim 5, wherein the door further comprises a lower trim that supports the lower extension portion of the diffusion member, the lower trim defining a seating groove that supports the lower bent portion of the back cover.

8. The appliance of claim 5, wherein the back cover further comprises a pressing portion configured to press the light guide plate toward the diffusion member.

9. The appliance of claim 8, wherein the door further comprises a rear supporter that supports a rear surface of the light guide plate, and
  wherein the pressing portion of the back cover passes through the rear supporter and is in contact with the light guide plate.

10. The appliance of claim 1,
  wherein the light source comprises a plurality of light emitting diodes (LEDs) and is configured to emit the light toward the light guide plate, and
  wherein the controller is configured to control the plurality of LEDs based on the sound output from the output interface.

11. The appliance of claim 1, wherein the controller is configured to:
  communicate with a remote device;
  receive a music playback command from the remote device; and
  based on receiving the music playback command from the remote device, play music through the output interface and control the light source based on the music played through the output interface.

12. The appliance of claim 11, further comprising a non-transitory memory configured to store a control pattern for controlling the light source,
  wherein the controller is configured to, based on receiving the music playback command from the remote device, select the control pattern from the non-transitory memory and control the light source based on the selected control pattern.

13. The appliance of claim 11, further comprising a non-transitory memory configured to store a plurality of control patterns for controlling the light source,
  wherein the controller is configured to:
    based on receiving the music playback command and music information from the remote device, select a control pattern among the plurality of control patterns corresponding to the received music information; and
    control the light source based on the selected control pattern.

14. The appliance of claim 13, wherein the music information comprises a least one of a music genre or a beats per minute (BPM).

15. The appliance of claim 14, wherein the controller is configured to:

based on the selected control pattern including on-times and off-times of the light source, control a blinking time of the light source based on the BPM, the blinking time corresponding to an interval between one of the on-times and one of the off-times, and decrease the blinking time of the light source based on an increase of the BPM, or wherein the controller is configured to:

based on the selected control pattern including a color change of the light source, control a color change period or a number of color changes of the light source based on the BPM, and decrease the color change period or increase the number of color changes of the light source based on an increase of the BPM.

16. The appliance of claim 11, wherein the controller is configured to, based on receiving the music playback command and control information of the light source from the remote device, play the music through the output interface and control the light source based on the received control information.

17. The appliance of claim 11, further comprising a sound sensor configured to detect the sound output from the output interface, wherein the controller is configured to, based on receiving the music playback command from the remote device, play the music through the output interface and control the light source based on sound information detected by the sound sensor.

18. The appliance of claim 1, further comprising:

a manipulator or a display configured to receive input of a command for playing music through the output interface; and a non-transitory memory configured to store a control pattern for controlling the light source, wherein the controller is configured to, based on receiving the command through the manipulator or the display, play the music through the output interface and control the light source based on the music played through the output interface.

19. The appliance of claim 1, wherein the light source comprises a plurality of light emitting diodes (LEDs), and wherein the controller is configured to control the light source to vary at least one of:

a portion of LEDs to be turned on among the plurality of LEDs, a number of the portion of LEDs, a position of the portion of LEDs, a lighting time of the portion of LEDs, a brightness of light emitted from the portion of LEDs, or one or more colors of light emitted from the portion of LEDs.

* * * * *